United States Patent [19]
Goshima et al.

[11] 4,192,608
[45] Mar. 11, 1980

[54] COPYING APPARATUS

[75] Inventors: Yoshitomo Goshima, Yokohama; Hiroyuki Hattori, Mitaka; Shiro Komaba, Kawasaki; Kazumi Umezawa, Yokohama, all of Japan

[73] Assignee: Canon Kabushiki Kaisha, Tokyo, Japan

[21] Appl. No.: 949,550

[22] Filed: Oct. 10, 1978

Related U.S. Application Data

[60] Continuation of Ser. No. 749,060, Dec. 9, 1976, abandoned, which is a division of Ser. No. 585,602, Jun. 10, 1975, Pat. No. 4,110,029, which is a division of Ser. No. 509,744, Sep. 26, 1974, Pat. No. 3,957,368.

[30] Foreign Application Priority Data

| | | | |
|---|---|---|---|
| Sep. 27, 1973 | [JP] | Japan | 48-108677 |
| Oct. 1, 1973 | [JP] | Japan | 48-111249 |
| Oct. 5, 1973 | [JP] | Japan | 48-116829[U] |
| Oct. 5, 1973 | [JP] | Japan | 48-116830[U] |
| Nov. 30, 1973 | [JP] | Japan | 48-135155 |
| Dec. 13, 1973 | [JP] | Japan | 48-140956 |
| Dec. 20, 1973 | [JP] | Japan | 48-146414[U] |
| Jan. 8, 1974 | [JP] | Japan | 49-5503 |
| Jan. 8, 1974 | [JP] | Japan | 49-5504 |
| Feb. 12, 1974 | [JP] | Japan | 49-16988 |

[51] Int. Cl.$^2$ ...................... G03B 27/48; G03B 27/50; G03B 27/70

[52] U.S. Cl. ........................................ 355/51; 355/8

[58] Field of Search ........................ 355/50, 51, 8, 11; 188/77 W; 74/821, 845; 192/26

[56] References Cited

U.S. PATENT DOCUMENTS

| | | | |
|---|---|---|---|
| 3,012,520 | 12/1961 | Curtis | 104/235 |
| 3,021,512 | 2/1962 | Welsh et al. | 360/106 |
| 3,024,669 | 3/1962 | Creed et al. | 74/821 |
| 3,064,766 | 11/1962 | Hanizeski | 188/77 W |
| 3,321,992 | 5/1967 | Kawada | 74/845 |
| 3,672,762 | 6/1972 | Suzuki et al. | 355/8 |
| 3,697,165 | 10/1972 | Morriston et al. | 355/8 |
| 3,727,732 | 4/1973 | Barr | 192/26 |
| 4,148,578 | 4/1979 | Bujese | 355/8 |

*Primary Examiner*—Richard A. Wintercorn
*Attorney, Agent, or Firm*—Fitzpatrick, Cella, Harper & Scinto

[57] ABSTRACT

A copying apparatus capable of copying sheet originals and thick originals comprises sheet original transport means for transporting a sheet original, thick original carrier means for carrying thereon a thick original, optical means for projecting the image of an original upon a photosensitive member, copy process means for processing copies, and drive means for operating the copy process means. At least a part of the optical means is movable to selectively form an exposure surface at the position of the sheet original exposure surface of the sheet original transport means or the thick original exposure surface of the thick original carrier means.

2 Claims, 55 Drawing Figures

COPYING APPARATUS

This is a continuation of application Ser. No. 749,060 filed Dec. 9, 1976, now abandoned, which is a division of application Ser. No. 585,602 filed June 10, 1975, now U.S. Pat. No. 4,110,029, issued Aug. 29, 1978, which in turn is a division of application Ser. No. 509,744 filed Sept. 26, 1974, now U.S. Pat. No. 3,957,368, issued May 18, 1976.

BACKGROUND OF THE INVENTION

1. Field of the Invention

This invention relates to a convenient copying apparatus which can fully function both as a sheet original copying apparatus and a thick original copying apparatus and which is capable of increasing the copying speed in accordance with the copy size and incorporates various devices for convenient use.

2. Description of the Prior Art

Copying machines have heretofore been classified into two types, namely, those for copying sheet originals exclusively and those capable of copying books or other three-dimensional originals.

The copying machines exclusively for sheet originals cannot copy books or other thick originals but they can produce copies of sheet originals simply by inserting sheet originals into an inlet port and for one and the same process, these machines involve no copying stroke of the original carriage or the optical system and can correspondingly increase the copying speed (by approximately two times). Further, the mechanical constructions are simple and this leads to economical advantages of the machines. Also, the copying machines of this type readily permit inclusion of autofeeder devices for originals.

In contrast, the copying machines capable of producing copies of books or other thick originals have a great advantage that they can copy sheet originals as well as books or like originals, but inasmuch as these machines are designed such that any original to be copied must be flatly spread over the original carriage, a sheet original as well as a thick original has to be placed on the glass plate of the original carriage by manually raising an original keep cover and then closing the cover, whereafter a copy button must be depressed to effect copying. Further, the original carriage or the optical system in these machines has the copying stroke, which means a corresponding loss of time, and thus the copying speed is necessarily reduced for one and the same process. Moreover, complicated mechanical constructions lead to higher cost of the machines. Further, it is very difficult to provide these machines with autofeeder devices for originals.

For the reasons set forth above, the two types of copying machines enjoy their own markets.

In most offices, however, demand concentrates on copies of sheet originals rather than copies of thick originals. Therefore, users have been compelled to purchase more expensive thick original copying machines at the sacrifice of the expediency of the sheet original copying machines. To overcome such inconsistency, there have been devised some copying machines which retain the features of sheet original copying machines and are still capable of copying thick originals as well. These include the following types:

I. The type wherein the portion of the machine which is above the passage surface for a sheet original is removable, and when copies are to be made to a thick original, such portion is removed to expose the sheet original transport rolls in the machine body so that the thick original is manually urged against the rubber rolls, which transport the thick original for slit exposure; and II. The type which is similar in construction to the type I, with the exception that a carrier comprising a transparent plate of glass, plastics or like material is prepared on which a thick original may be placed and two or more pairs of transport rolls hold therebetween the ends of the carrier to transport the carrier for exposure.

Since these machines differ very little in mechanical construction from the sheet original copying machines, they are not so expensive, although they suffer disadvantages as follows:

(1) On the part of users, it is considerably cumbersome to remove a portion of the machine and a limited office space would offer a problem of finding a space for the removed portion. Further, the method II above would offer problems in storing the carrier.

(2) In the method I above, a great load variation would occur with respect to the machine body depending on the manner in which the original is urged, and in the method II above, the thickness of the carrier would cause a corresponding variation in the length of the optical path, which would result in improper focusing and accordingly a corresponding error of periodic speed, thus greatly aggravating the quality of resultant copy images.

(3) A gear and sprocket wheel arrangement for driving the original transport rolls at the end thereof, and in the method II, the carrier transport rolls, are projected upwardly beyond the original transport surface and such surface cannot be made flat, thus making it impossible to copy a part of a large-sized original.

(4) Where the original to be copied is a book or the like having a substantial thickness and having the leading edge thereof (as viewed in the direction of transport) complicatedly configured (due to the presence of a book cover or the inclined edge surface resulting from the opened position of the book), an edge detector switch for detecting the leading edge of sheet original is used to detect the leading edge of the book and this results in appreciable irregularities of the leading edge position in the resultant copies.

Thus, the above-mentioned types of machines are hardly available for practical use and the above-noted features could only be the sales points, at best.

It will thus be noted that these conventional copying machines cannot be said to be completely practical. However, as an improvement over the prior art, the following system has been proposed and successfully put into practice.

According to this system, an electrophotographic copying machine of the movable carriage and slit exposure type is constructed such that a movable original carriage and a sheet original transport portion comprising two or more pairs of rolls have their exposure surfaces in the same plane and the original carriage and the sheet original transport portion are integral. To produce copies of a sheet original, the original may be inserted into the sheet original transport portion and thereby moved to an illuminating portion. When copies of a book or other thick original are to be produced, this system is highly useful because it has overcome the above-noted various disadvantages. However, application of such system to the copying machines for the production of large-sized copies would encounter the following operational and technical problems:

(1) It is difficult to insert a sheet original of large size into the sheet original inlet port because the insertion of sheet original must be done horizontally; and (2) The movable original carriage is so heavy that smooth reciprocation thereof is difficult.

With regard to developing device, liquid development is superior to dry development in that it is higher in developing efficiency and can provide better image reproduction. On the other hand, liquid development is delicate in developing action and therefore, cumbersome procedures are required in construction of the portion in which the photosensitive medium is contacted by developing liquid, and maintenance of the toner density of the liquid and the circulation system therefor as well as periodic servicing or inspection is imperative.

Particularly, the developing electrode portion is provided with various mechanisms for ensuring production of good copies, such as a scraper for removing stains on that side of transfer paper adjacent the separator belt and a fog removing roller for removing any fog from the transfer paper, and these mechanisms require periodic servicing or inspection and would sometimes require replacement of parts, disassembly and/or cleaning.

Further, if the width of transfer paper is increased, the width of the developing electrode will also have to be increased and this will unavoidably lead to an increased size of the developer container on which the developing electrode is mounted.

The increased size of the developer container means a correspondingly increased quantity of developing liquid therein, which would prevent sufficient agitation of the developing liquid, thus reducing the frictional charging efficiency of toner and carrier in the developing liquid.

If powerful agitation is effected to enhance the agitating efficiency, the agitation will increase the temperature of the developing liquid to thereby increase the amount of developing liquid consumed due to natural evaporation of the liquid.

When copying operation is started after a long downtime, liquid agitation cannot sufficiently be achieved in a short time, as a result of which the first several copies would be low in contrast. Also, the developing device itself would become larger than size A2 (420×594 mm) and accordingly heavier in weight and therefore, if the developer container and the developing electrode were constructed integrally with each other as described, the developing device would become inconvenient to take in and out of the machine body and difficult to service and inspect.

During down-time of the machine, developing liquid tends to evaporate and toner in the carrier liquid readily solidifies into toner masses, which may mix with the circulating developing liquid and be supplied to the developing electrode portion to create unevenness of the resultant copy images or injure the photosensitive medium.

Also, in the electrophotographic art using liquid developer to develop electrostatic latent image, there has heretofore been a developing device which comprises a developer containing portion for containing the developer therein and a developing portion for developing an object to be developed on a photosensitive medium or the like, the developer containing portion and the developing portion being individually constructed with a distance therebetween. In such device, the developing portion and the developer containing portion have been connected together by pipes or other connecting means so that the developer may be supplied from the containing portion to the developing portion and collected from the letter into the former portion. For the purposes of maintenance, repairs, inspection or the like, removal of the developer containing portion or the developing portion must be done either by excepting the connecting pipes or by simultaneously removing the two portions unstably connected by the thin pipes. In the first-named case, one end of the excepted pipes would interfere with the removal of the portion to be removed, and developer would even leak through the disconnected pipe end to contaminate the device. In the latter case, simultaneous removal of the two portions connected by the thin pipes is a difficult task and, even if only one of the two portions is to be removed, both portions need be removed and this is wasteful and time-consuming work.

For the detection of the density of the developing liquid in the developing device of the copying machine, use has been made of photoelectric detector means which comprises a light source or lamp and a light-sensing element. However, such photoelectric detector means simply immersed in the developing liquid may often have its detecting function reduced by toner which tends to precipitate and solidify to stick to a wall portion corresponding to the optical path of the photoelectric detector means. In another prior art arrangement wherein the photoelectric detector means is disposed outside the developer container and supply of developing liquid is effected by pumping means, when the copying machine has been stopped from operating, developing liquid rarely stays in the detector means so that the surface of a transparent member accommodating therein the light source and light-sensing element is dried to permit residual toner to stick to said surface, thus rendering accurate detection of the density of developing liquid impossible.

In the drying-fixing device of copying machine, a heat source commonly used is a heating plate which comprises a plate-like nichrome wire wound around a flat mica plate and having the opposite surfaces covered with layers of mica for insulation, the heating plate being urged against a metal plate of good heat conductivity to heat the metal plate. Since, however, the mica as the insulating material is hard, it is dificult to bring such material into intimate contact with the heating plate and this is particularly so when the heating plate has a complicatedly curved surface configuration. Therefore, poor heat transfer may occur in the areas of non-contact between the plate-like heater and the heating plate and the portion of the nichrome wire in such areas may often be overheated and broken. Further, unless the heating plate directly contacted by copy medium, for example, paper, has a curved surface designed well in view of the properties of the paper when heated and the configurations of the passages before and after the heating plate, the contact between the paper and the heating plate would be worse to reduce the heat transfer efficiency therebetween.

In the conventionally used heating plate type heater structure which comprises a convex-surfaced heating plate, a plate-like heater and a support plate having a convex surface similar to that of the heating plate and wherein the heater is brought into intimate contact with the heating plate by bolting it to a bottom plate integral with the heating plate, the simple convex configuration of the heating plate permits the plate-like heater to be well brought into intimate contact with the heating plate by adjusting the fastening force of screws in use. However, if the screws are tightened too much, the heating plate will be deformed or the support plate will be deformed by the repulsion of the plate-like heater, thus adversely affecting the contact and causing the above-noted disadvantages. If the thickness of the heating plate and of the support plate is increased to prevent the deformations thereof, their heat capacities will be increased to increase the time required for them to attain a predetermined temperature. Thus, the heater structure now under discussion is hardly applicable to the heat plate having surfaces concavely and convexly curved in accordance with the properties of paper and with the configurations of the passages before and after the heating plate.

Further, in the development process of the wet type electrophotographic copying machines, solution of hydrocarbon is used as carrier and some amount of such solution remains on the surface of copy paper onto which a toner image has just been transferred from the photosensitive drum. In the drying-fixing devices of the type which fixes the toner image on the copy paper while evaporating the residual hydrocarbon, it is required that the heat from the heat source be efficiently transferred to the copy paper.

Such drying-fixing devices include: (a) those which use infrared ray lamps; (b) those which utilize a blast of hot wind; and (c) those which employ heating plates. Type (a) suffers from disadvantages resulting from heat scattering, temperature rise in the machine and adverse effect of infrared rays on the image transfer device. Type (b) is low in drying efficiency and requires the copy paper transport passage in the drying-fixing device to be longer, which in turn leads to a large size of the device.

Type (c) is such that the heating plate is heated to about 230° C. by a heater and copy paper is advanced over the heating plate with the back side thereof in contact therewith for drying and fixing, and if a good contact is provided between the heating plate and the copy paper the device of this type may be small in size and light in weight to accomplish the drying and fixing with a very high efficiency.

Nevertheless, the properties of copy paper which will be warped when heated make it very difficult for such copy paper to advance while maintaining a good contact with the heating plate, and there is another problem that the distance of transport on the heating plate cannot be so long because of the requirement for reduced size of the device.

Also, in copying machines, special attention is paid to the design thereof so as to prevent jamming of copy paper in the interior of the machine, but should jamming occur, removal of the jammed paper must and can be done with ease. For this purpose, it has heretofore been practised to provide the copy paper transport passage by divided surfaces to thereby permit the copy paper transport portion to be divisibly constructed.

However, various factors may cause copy paper to be jammed as it is transported in a narrow passage. Thus, a design for reducing the frequency of jamming is necessary and at the same time, a construction is necessary which will readily permit removal of jammed paper whenever it occurs.

Further, the copy paper feeder bed of copying machine has heretofore been designed such that it can carry thereon and supply therefrom a plurality of sizes, including a maximum size and lesser sizes, of copy mediums in accordance with the performance of the machine.

However, when one side plate of the paper feeder bed is displaced to match a small size of copy paper, the distance between springs and paper feed roll which produce paper feeding forces differs from one side to the other side of the feeder bed, and this in turn leads to different pressure contact forces and accordingly different feeding forces on the opposite sides, with a result that copy paper is fed obliquely.

Also, confirmation of the sizes of copy paper carried on the feeder bed must be directly done by manually opening a lid such as outer plate or the like.

SUMMARY OF THE INVENTION

It is therefore an object of the present invention to provide a copying apparatus which can fully function both as sheet original copying machine and thick original copying machine.

It is another object of the present invention to provide a copying apparatus in which optical paths for sheet original and thick original may selectively be formed to produce copies of sheet original and thick original.

It is still another object of the present invention to provide a copying apparatus in which a mirror in the image forming optical path is rotatable or movable to thereby simply permit selection of sheet original copying or thick original copying.

It is a further object of the presnt invention to provide a copying apparatus which permits the developing device to be taken in and out of the machine body.

It is a further object of the present invention to provide a copying apparatus which readily permits removal of the developing portion or the developer containing portion without causing leakage of developer.

It a further object of the present invention to provide a copying apparatus having a developing liquid supply device which can remove dust or other impurities from the developing liquid.

It is a furher object of the present invention to provide a copying apparatus which effects highly accurate detection of the density of developing liquid.

It is a further object of the present invention to provide a copying apparatus having a copy paper drying-fixing device in which a heating plate having surfaces complicatedly curved in accordance with the properties of copy paper and the configurations of the passages before and after the heating plate is constructed for high thermal efficiency and high durability.

It is a further object of the present invention to provide a copying apparatus which readily permits removal of copy paper whenever it is jammed within the machine.

It is a further object of the present invention to provide a copying apparatus havng a paper feeder bed which provides stable feeding force for copy paper.

It is a further object of the present invention to provide a copying apparatus which can detect and indicate the sizes of copy paper carried on the paper feeder bed.

It is a further object of the present invention to provide a copying apparatus in which shocks resulting from reciprocal movement of the original carriage may be alleviated.

It is a further object of the present invention to provide a copying apparatus in which the photosensitive drum may be rigidly supported.

The above objects of the present invention may be achieved by the designs which will hereinafter be described.

A mirror in the optical path for image formation may be moved to selectively form two optical paths, one for sheet original and one for thick original such as book or the like, so as to enable either of sheet original and thick original to be simply copied.

In the developing device, the developer container and the developing electrode portion are constructed separately and connected together by pipes and the developing electrode portion is coupled to a member slidably fitted to a strut provided for reinforcement of the copying machine body, so that the developing electrode portion may be slidden along the strut so as to be withdrawn outwardly from the machine body for servicing or inspection.

Further, only one end or a predetermined portion of the supply and collection pipes connecting the developer containing portion and the developing portion may be removed to provide the following connections. That is, the supply pipe of the developer containing portion may be connected to the collection port of the container (or the collection pipe of the developer containing portion may be connected to the supply port of the containing portion) and in the developing portion, one end of the collection pipe thereof may be connected to the supply port of the developing portion (or one end of the supply pipe of the developing portion may be connected to the collection port of the developing portion).

A path is provided between the portion of the developing device which develops the electrostatic latent image and the developer container to permit circulation of developing liquid therebetween. In such path, there may be provided a member for impacting and dispersing toner masses solidified in the developing liquid. This member may serve not only to disperse toner masses but also to remove dust or other impurities in the liquid or to fully filterate the liquid. As an example of the method of dispersing toner masses, the developing liquid in the developer container may be pumped to the developing portion, whereafter the head between the developing portion and the developer container may be utilized to cause the developing liquid to fall toward a filter formed of an aggregate of fibrous material or thin parallel metal plates or a metal netting or the like so that the impacting force of the liquid may disperse toner masses.

In the density detector device, a pumping mechanism including an impeller and a casing forming a spiral chamber is provided in the developing, liquid, and the casing may have a slit-like or other opening formed in a portion thereof through which the developing liquid may be directly passed to the passage portion of photoelectric detector means.

In the fixing device, there is a heating plate having surfaces curved to match the properties of transfer paper when heated and the configuration of paper transport passage, and a plate-like heater is uniformly brought into intimate contact with the heating plate to improve the heat transfer efficiency and to prevent breakage of nichrome wire and increase its durability. The heating plate may be a thin plate which will lead to the provision of a fixing device capable of attaining a quick temperature rise.

Further, the passage surface of the fixing device may be divided so as to prevent jamming of copy paper within the machine and also to permit removal of copy paper whenever it is jammed.

In the copy paper feeder bed, separator pawls, side plates, intermediate plates and springs are all movable together to provide a stable paper feeding force.

Also, in order to eliminate the necessity of directly confirming the sizes of copy mediums carried on the paper feeder bed by manually opening the lid such as outer plate or the like, lamps or like means are provided outside the machine to enable detection and indication of the sizes.

In the buffer and stop device for original carriage, the kinetic energy of the original carriage may be converted into a potential energy of spring to decellerate and stop the carriage, thus alleviating the shock sufficiently. The construction therefor may be relatively simply realized by the use of energy absorbing springs and a one-way clutch mechanism, which leads to a high reliability and lower cost. For the movement of the original carriage in the opposite direction, the energy accumulated in the springs may assist the carriage in attaining a quick start and this means an effective utilization of energy.

In the photosensitive drum supporting device, a support member for supporting the fixed end of a cantilever which supports the photosensitive drum is coupled to a pair of side-plate frames adjacent the cantilever.

The above and other objects and features of the present invention will be more fully apparent from the following detailed description taken in conjunction with the accompanying drawings.

DESCRIPTION OF THE PREFERRED EMBODIMENTS

Figure 1:
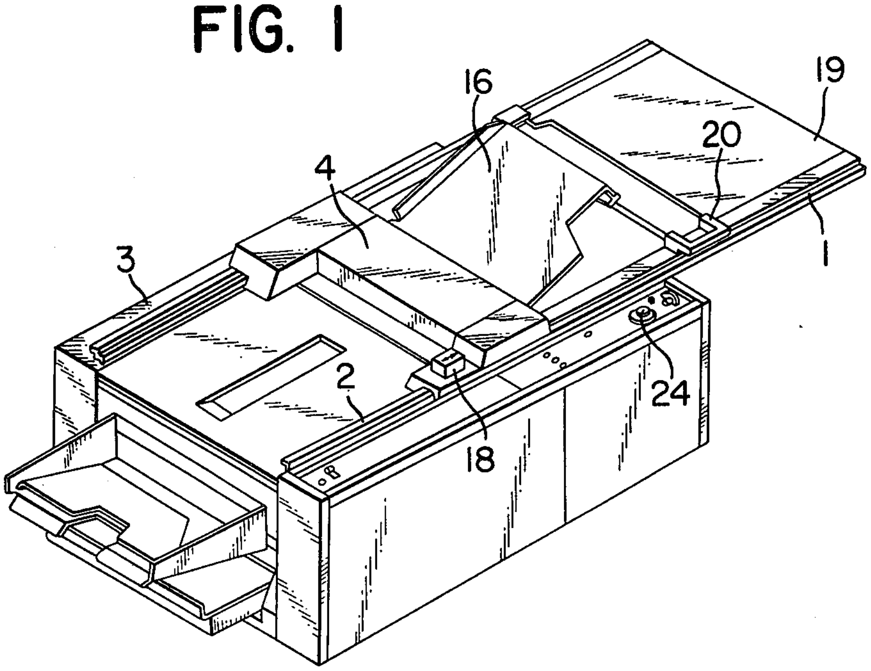
FIG. 1 is a perspective view of a copying apparatus according to the prior art.
Figure 2:
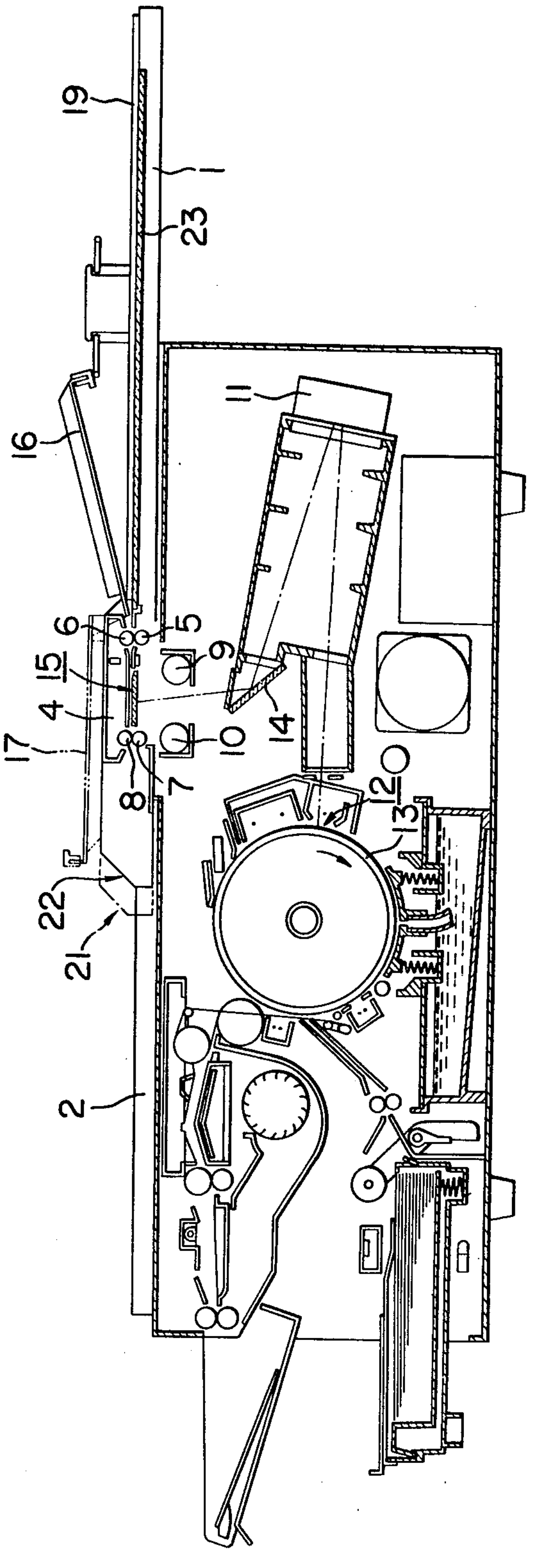
FIG. 2 is a longitudinal cross-section of the FIG. 1 apparatus.

FIG. 1 is a perspective view of a copying apparatus according to the prior art, and FIG. 2 is a longitudinal section thereof. On top of an apparatus housing, a movable original carriage 1 is mounted for reciprocal movement under guidance of rails 2 and 3 on the apparatus housing. A sheet original transport portion comprising transport rolls 5, 6, 7 and 8 is constructed as a unit on the forward end (the left end as viewed in FIG. 2) of the movable original carriage. Within the apparatus housing, illuminating lamps 9 and 10 are provided to illuminate an original from therebelow. The image of the original may be directed via a mirror 14 and an in-mirror lens 11 and focused on an exposure portion 12 of a photosensitive drum 13, as indicated by a dot-and-dash line in FIG. 2. FIG. 2 shows the apparatus when it is used to produce copies of a sheet original. The sheet original may be inserted along an insertion guide plate 12 and toward the transport rolls 5, 6 and passed through an illuminating portion 15 and finally discharged out of the apparatus by the transport rolls 7, 8. Under such conditions, the movable original carriage is immovably fixed on the apparatus housing with the electrical system of the carriage being coupled to the apparatus body by means of connector.

For the production of copies of a book or other thick original, a change-over knob 18 (FIG. 1) may be moved leftwardly to unlock a lock mechanism for the movable original carriage to thereby permit the carriage to move from a position 22 to a position 21 in FIG. 2. Such movement releases the connector between the original carriage and the apparatus body. When the sheet original insertion plate 16 is pivotally moved to overlie the sheet original transport portion (as indicated by 17 in FIG. 2), the apparatus may now be used in the same manner as the ordinary thick original copying machine, namely, by gripping a handle 20 to open an original keep cover 19, placing an original on a glass plate 23 and depressing a copy button 24 to automatically reciprocate the original carriage for copying operation. A latent image formed on the photosensitive drum may be subjected to various processes such as development and image transfer to thereby provide a visible image on copy paper.

Figure 13:
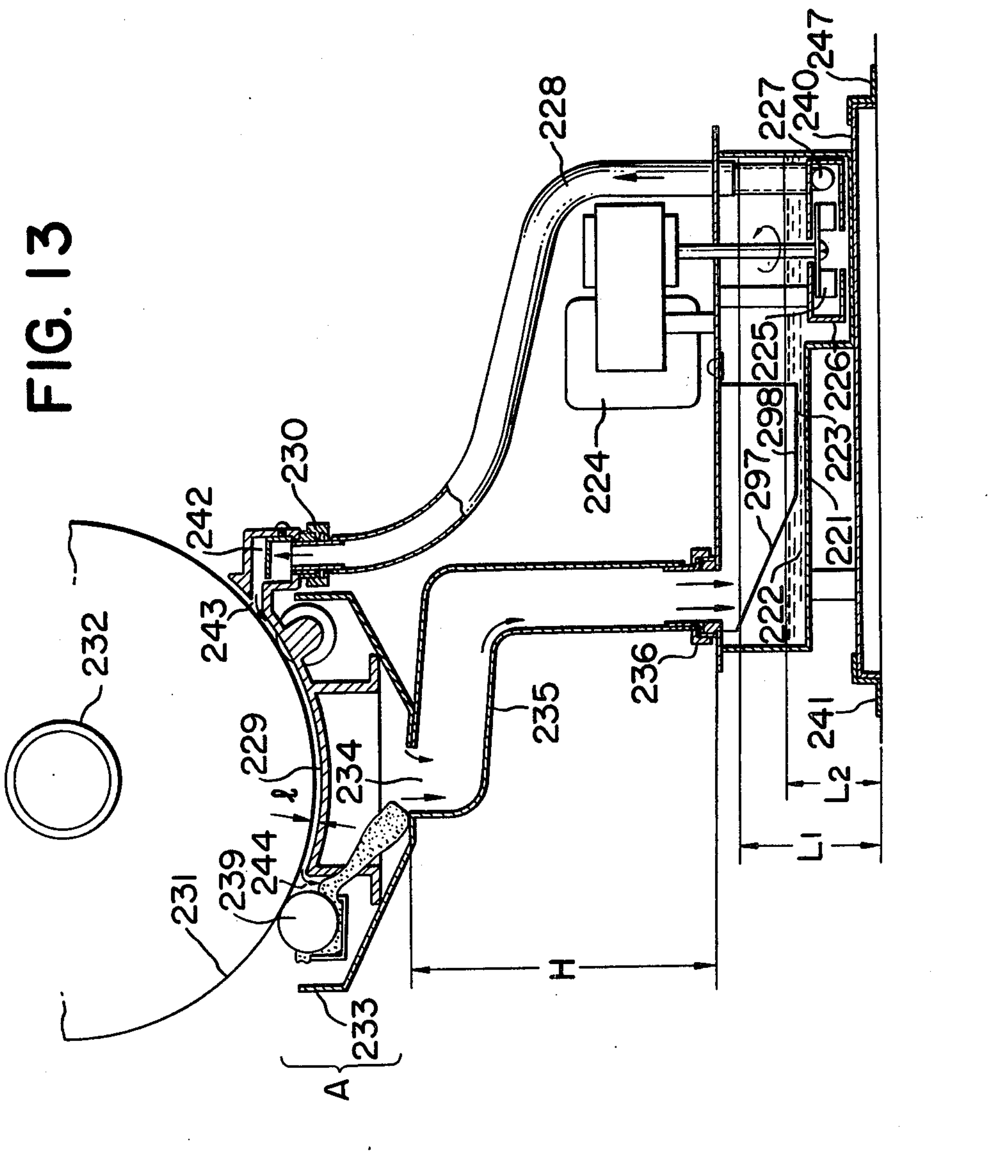
FIG. 13 is a cross-sectional view illustrating the flow of developing liquid in an embodiment of the developing device.

FIG. 13 is a perspective view of a copying apparatus according to the present invention, which includes an apparatus housing 25, a sheet original transport portion 26, and an original carriage 27 for carrying thereon a thick original (hereinafter referred to as "book original") and normally covered with an original keep cover 28. There are further provided original carriage guide rails 29, 30 and paper feeder beds 31,32 for carrying thereon sheets of transfer paper P, the upper and lower beds being capable of containing different sizes of transfer paper. The present apparatus further includes auxiliary trays 34,35, an operating portion 36, a main switch 37, a group of indicator lamps 38–40, a selector switch 41 for selecting the upper one of the two paper feeder beds, a selector switch 42 for selecting the lower one of the two paper feeder beds, a change-over lever 43 for effecting the change-over between a sheet original and a book original, a knob 44 for selecting the number of copies to be continuously produced, a copy button 45, an emergency stop button 46 useful during continuous copying of book original, and a throttle dial 47 for adjusting the copying speed.

Figure 4:
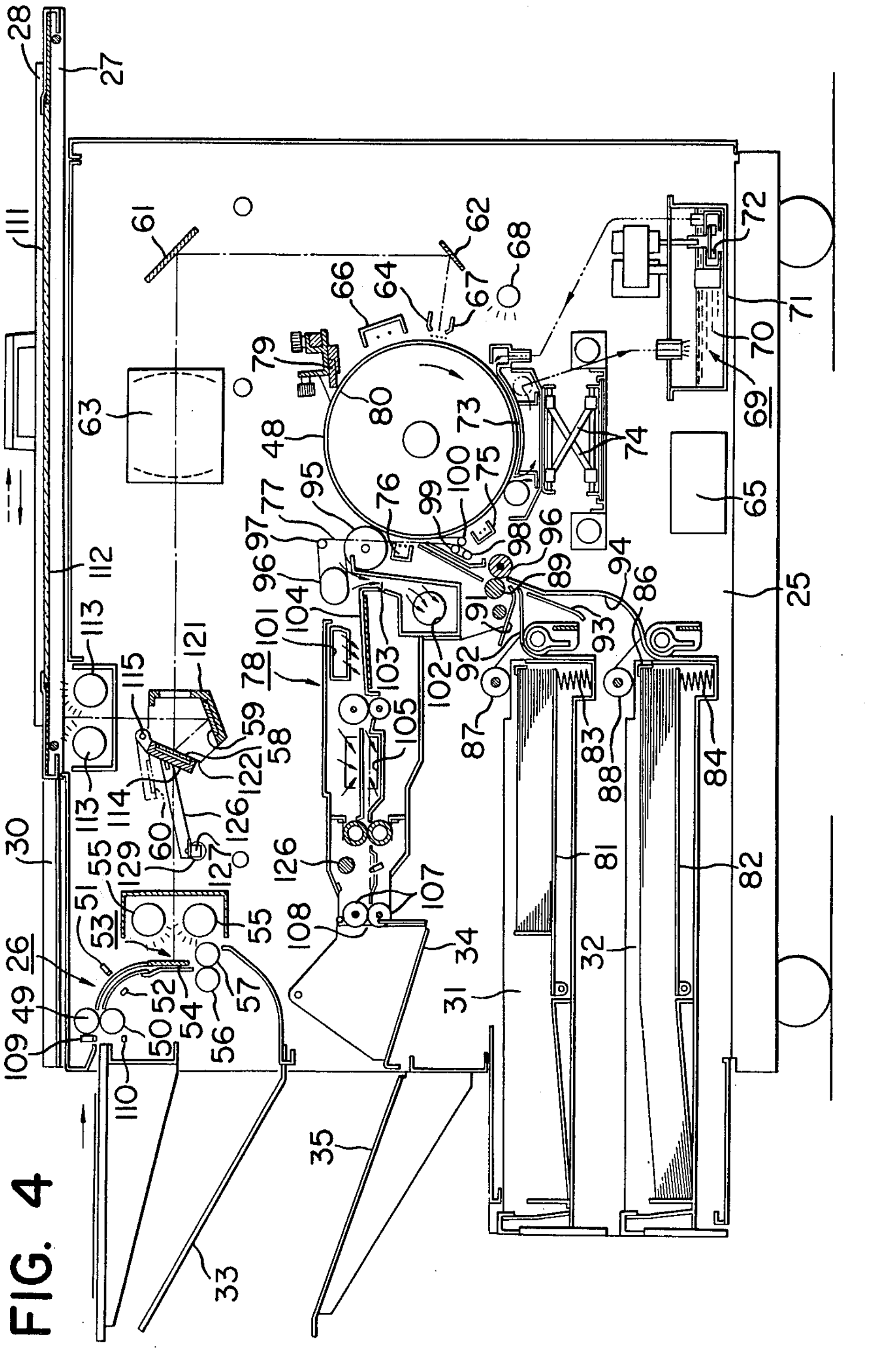
FIG. 4 is a longitudinal cross-section of the FIG. 3 apparatus.

Referring to FIG. 4, operation of such copying apparatus will now be described with respect to the copying of sheet original. As a sheet original is inserted from the left between rolls 49 and 50 of the sheet transport portion 26 which are rotating in synchronism with a drum 48, the sheet original is transported rightwardly. When the leading edge of the sheet original is detected by a lamp 51 and light-sensing element 52, the rolls 49 and 50 are temporarily stopped and accordingly the sheet original is also stopped. Next, when the photosensitive drum 48 has reached a predetermined position, a start signal for the original is produced to cause the rolls 49 and 50 to be again rotated to transport the original now downwardly in synchronism with the photosensitive drum 48, so that the original is discharged through rolls 56,57 onto a tray 33 outside the apparatus housing. During that time, the original is illuminated by two lamps 55 in an illuminating portion 53 from the right-hand side as it passes the left side of a glass plate 54. At that time, as will further be described, a single mirror 58 is in its up position as indicated by dots-and-dash line, so that the image of the original is passed through a lens 63 and via mirrors 61,62 and focused on the photosensitive drum 48 in an exposure portion 64.

The photosensitive drum 48 comprises a photosensitive layer covered with a transparent insulating layer, and is normally rotating in clockwise direction as shown in FIG. 4. The photosensitive drum 48 is first positively charged by a primary charger 66 supplied with a positive high voltage from a high voltage source 65. When the photosensitive drum reaches the exposure portion 64, it is slit-exposed to the image from the illuminating portion 53 and simultaneously therewith, it is subjected to AC discharge from an AC discharger 67 supplied with a high alternating current from the high voltage source 65. Subsequently, the photosensitive drum is subjected to an overall exposure by a lamp 68, thereby forming an electrostatic latent image on the surface of the photosensitive drum, whereby the drum enters a developing device 69. The developing device 69 comprises a container 71 for developing liquid 70, a pump 72 for agitating and raising the developing liquid, and a developing electrode 73, which is adapted to be urged toward the photosensitive drum 48 by a linkage 74 with a slight clearance maintained with respect to the drum 48. The electrostatic latent image formed on the photosensitive drum 48 is developed into a visible image by the toner in the developing liquid 70 raised over the developing electrode 73 by the pump 72. Next, the photosensitive drum 48 is negatively charged by a post-charger 75 supplied with a negative high voltage from the high voltage source 65, whereby any excess developing liquid on the drum 48 may be squeezed out without disturbing the formed image. Subsequently, a sheet of transfer paper P delivered from the paper feeding portion is brought into intimate contact with the photosensitive drum 48 and at a transfer charger 76, the image on the drum 48 is transferred onto the transfer paper P with the aid of charging by a positive high voltage from the high voltage source 65. After the image transfer, the transfer paper P is separated from the photosensitive drum by a separator belt 77 and directed to a drying-fixing portion 78. The photosensitive drum 48 is wiped by the edge portion 80 of a blade cleaner 79 urged thereagainst to remove any residual toner and developing liquid, whereafter another cycle of operation is repeated. The developing liquid so removed by the blade cleaner 79 is directed through grooves formed on the photosensitive drum 48 at the opposite end portions thereof and is reusable for development.

On the other hand, sheets of transfer paper P are contained in the paper feeder beds 31 and 32 which are mounted on the lower left feeder portion of the apparatus body for retraction to the left (in FIG. 4) by means of rails. Two of such paper feeder beds may be provided in accordance with different sizes of transfer paper and either of them may be selected by depression of selector button 41 or 42. Stocks of transfer paper P are carried on intermediate plates 81 and 82 within the feeder beds 31 and 32, respectively, and these intermediate plates 81 and 82 are normally biased upwardly by springs 83 and 84, respectively, so that the stocks of transfer paper P are maintained urged against separator pawls 85 and 86 which are provided on the opposite sides of the paper feeder beds at the forward end thereof. By suitably selecting a spring constant for the springs 83 and 84, the stocks of transfer paper P may be urged against the separator pawls 85 and 86 with a substantially constant force, independently of the quantity of the transfer paper P in the paper feeder beds 31 and 32.

When the photosensitive drum 48 reaches a predetermined position, a signal is produced to lower the normally rotating paper feed roll 87 or 88 into pressure contact with the uppermost sheet of transfer paper P in the upper feeder bed 31 or the lower feeder bed 32, and the roll cooperates with the separator pawl 85 or 86 to separate the uppermost sheet P and feed it from the feeder bed 31 or 32 toward the right as viewed in FIG. 4. However, register rolls 89,90, disposed closely adjacent the feeder beds, have been stopped immediately after the lowering of the paper feed roll 87,89, so that the sheet of transfer paper P fed from the feeder bed 31 or 32 will form a slack between guides 91 and 92 with the leading edge of the paper sheet P striking the nip between the register rolls 89 and 90. Immediately thereafter, the photosensitive drum 48 produces a paper feed start signal which rotates the register rolls 89 and 90 to transport the transfer paper sheet P at a speed equal to the peripheral speed of the photosensitive drum 48. On the other hand, the paper feed roll 87 or 88 is again lifted away from the stock of transfer paper P a predetermined time after its lowering, whereafter paper transport is effected by the register rolls 89,90 and subsequent paper transport means.

The transfer paper separator belt 77 is in the form of a thin endless belt and extends over a separator roll 95 closely spaced from the photosensitive drum, and around deflector pulleys 96,98 and pulleys 97,99,100. A portion of the belt which is between the pulley 100 and the separator roll 95 bears against the drum 48 over an area corresponding to one side edge of the transfer paper, and a portion of the belt which is between the pulleys 97 and 99 is caused by the action of the deflector pulleys 96,98 to follow a path deviated from the path of movement of the transfer paper. The separator belt 70 is driven by the separator roll 95 at a speed substantially equal to that of the photosensitive drum 48. During the image transfer, when a sheet of transfer paper P is in intimate contact with the photosensitive drum 48, the separator belt 77 intervenes between one side edge of the transfer paper and the surface of the photosensitive drum. As a result, at a point where the separator belt 77 is separated from the photosensitive drum 48 by the separator roll 95, the transfer paper P which has so far been in intimate contact with the drum has one side edge thereof forced away from the photosensitive drum. Once the side edge is so stripped from the drum surface, the transfer paper P is entirely separated from the surface of the photosensitive drum 48 with the aid of the self-supporting strength of the paper itself and the force of the wind drawn from a blower through a duct 102 into an intake port 103, whereafter the transfer paper is transported to the drying-fixing portion 78.

In the drying-fixing portion 78, the transfer paper P is heated by a heating plate heater 104 as it is leftwardly transported in contact with the heater, and also it is dried and fixed by the wind blowing through the duct 102.

The air drawn into the intake port 103 is the air staying within the apparatus and the draw-in of such air also results in cooling of the interior of the apparatus. As the drawn air passes through the intake port 103, it is somewhat heated by the heating plate heater 104. Part of the air so drawn in is discharged out of the apparatus, while the rest of the air is sent out through the duct 102 to provide the drying-fixing effect as described. The air thus warmed is finally discharged out of the apparatus by another blower (not shown) through an exhaust duct 105.

After having been dried and fixed, the transfer paper P has any residual charge thereon removed by a discharger 106, whereafter the tansfer paper is directed through discharge rolls 107 to a discharge port 108 for discharge onto a tray 34 or 35.

A lamp 109 and a light-sensing element 110, both disposed at the sheet original inlet port, perform the function which will be described below. In order to prevent deterioration of the photosensitive drum and other parts, the present copying apparatus is designed such that it stops its operation with its main switch remaining in ON position for ten and several seconds after completion of a copying operation. When this occurs, the sheet original inserted is detected by the lamp 109 and light-sensing element 110, whereupon the apparatus is again operated to permit a copying operation to occur.

Figure 3:
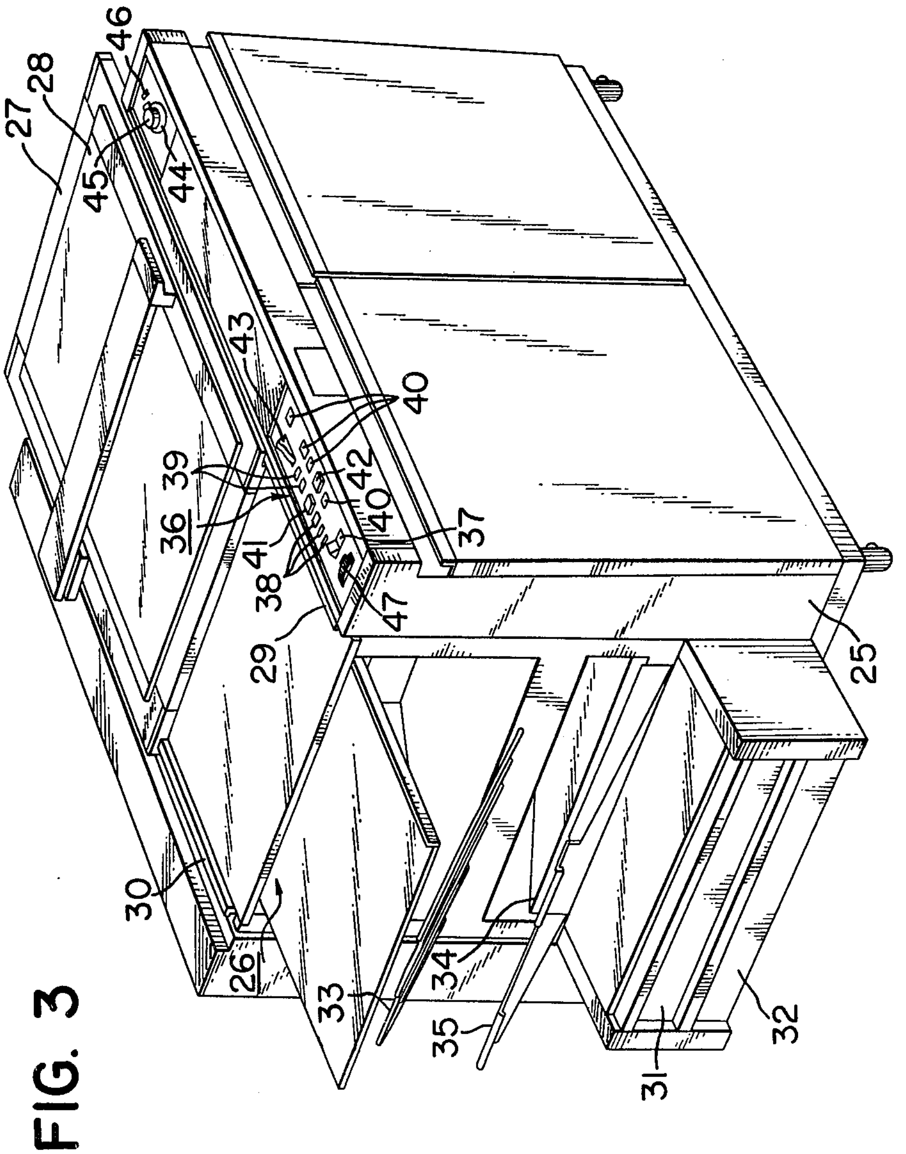
FIG. 3 is a perspective view showing an embodiment of the copying apparatus according to the present invention.

Operation for the copying of book original will now be described with reference to FIG. 4. Since the mirror 58 is now in its lowered position as indicated by full line, the image of an original may be projected via mirrors 59,58, lens 63 and mirrors 61,62 onto the drum 48. A book original to be copied is placed on the original carriage glass 111 with one end of the original registered to one end 112 of the glass, and then the book original is held down by the keep cover 28. When the copy button 45 (FIG. 3) is depressed, as in the case of sheet original, an original start signal from the photosensitive drum 48 moves the original carriage 27 leftwardly in FIG. 4 in synchronism with the peripheral speed of the photosensitive drum 48, so that the book original on the carriage is illuminated by illuminating lamps 133 to effect a slit exposure. Upon completion of the exposure, the original carriage 27 stops its leftward movement in response to a signal from the carraige 27 itself and in accordance with the size of the original, and immediately reverts to movement in the reverse or rightward direction. The speed of this reverse stroke is higher than that of the forward stroke to thereby increase the copying efficiency. As soon as the original carriage 27 returns to its initial position, the drive to the original carriage is cut off and the carriage comes to a halt.

When multiple copies of the same book original are to be produced continuously, this may readily be accomplished by the use of a counter device 44 operatively associated with the copy button 45. The counter device 44 holds the copy button 45 effective until a predetermined number of copies has been counted up, thus enabling production of multiple copies.

The other operations are similar to those in the case of sheet original.

Again in the case of book original, the apparatus stops its operation in ten and several seconds after completion of the copying, but in this case the copy button 45 also serves as a start switch and depression of this button will start the apparatus to resume a copying operation.

Figure 5:
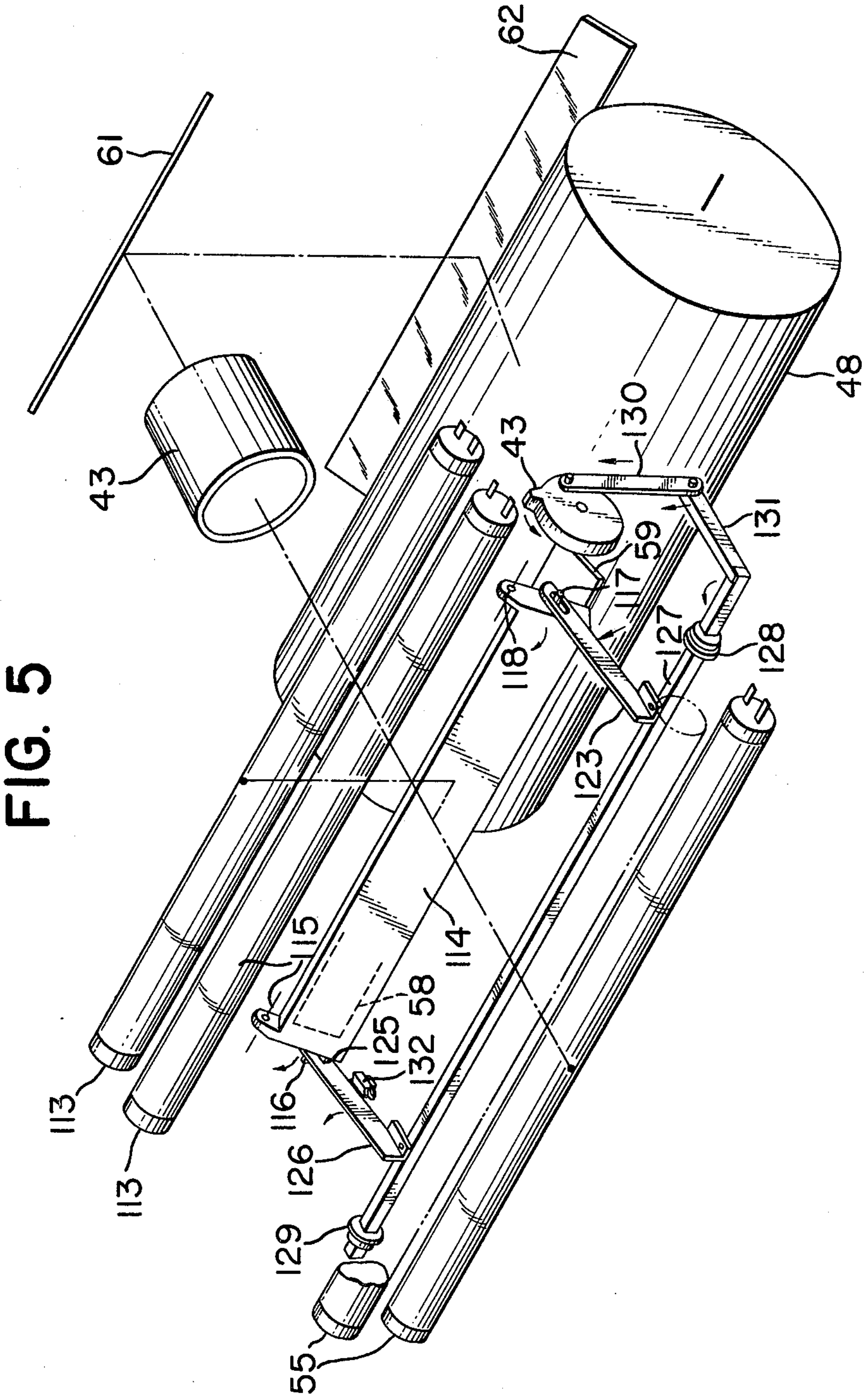

Next, the change-over between the book original copying mode and the sheet original copying mode will be described with reference to FIGS. 3 to 6. According to the present invention, as described above, the movable mirror 58 is moved to selectively form two optical paths for sheet original and book original, and a mechanism therefor will be described hereinafter. FIGS. 3 to 6 show the book original copying mode. In this mode, the image illuminated by the illuminating lamps 113, namely, the image of the original on the glass 111, is projected via mirrors 59, 58, lens 63 and mirrors 61, 62 onto the drum 48. When this occurs, the change-over lever 43 has been pivoted rightwardly (FIGS. 4 and 5).

Figure 6:
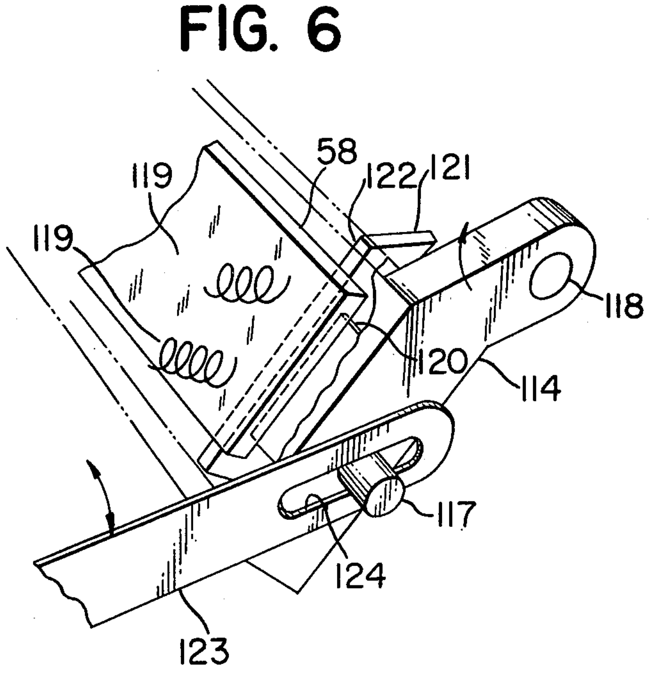
FIGS. 5 and 6 illustrate the change-over mechanism for optical means.

The mirror 58 is held inside a mirror block 114 by means of springs 119 (provided between the mirror block 114 and the mirror 58, see FIG. 6) and by means of metal fittings 120. In such book original copying mode, the mirror 58 is urged against the positioning surface 122 of antoher mirror block 121 by springs 119, thereby forming an accurate optical path for book original. The metal fittings 120 and the mirror 58 are then spaced apart, but when the mirror 58 is jumped up, the mirror and the metal fittings may be in contact with each other so that the mirror 58 may not be detached.

When the change-over lever is pivoted leftwardly, a shaft 127 of square cross-section is rotated counterclockwise by a link 130 and lever 131. The shaft 127 is rotatably journalled by means of bearings 128 and 129. The movement of the shaft 127 is transmitted to the mirror block 114 by levers 123, 126 and by pins 117,116 engaged with slots 124,125 in the levers 123,126 and secured to the mirror block 114. Since the mirror block 114 is pivotally supported by pin and hole connections 118,115, it is pivoted clockwise. A switch 132 (FIG. 5) detects the movement of the lever 126 and effects the change-over of the electrical control system between the book original copying mode and the sheet original copying mode. Since the mirror 58 has thus been jumped up, the image being illuminated by the lamps 55 (i.e. the image of a sheet original as its passes the left side of the glass 54) is projected via the lens 63 and mirrors 61,62 onto the drum 48.

Figure 7:
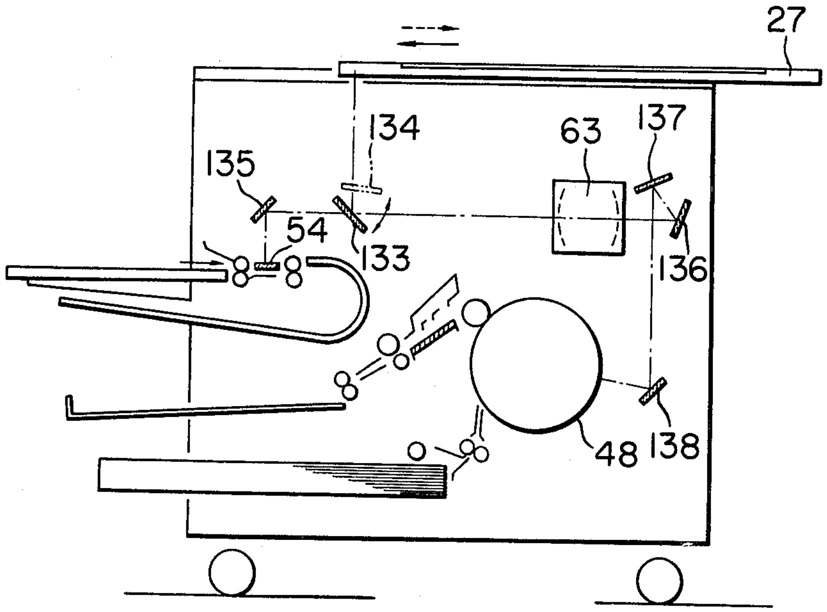
FIGS. 7, 8, 9 and 10 are schematic cross-sections of second, third, fourth and fifth embodiments of the present invention.

FIG. 7 shows a second embodiment of the present invention. This embodiment is substantially similar in construction to the first embodiment, excepting the mirror construction. In the book original copying mode, a movable mirror 133 is in the position as indicated by full line so that the image from the movable original carriage 27 may be projected upon the drum 48. When the mode is changed over to the sheet original copying mode, the mirror jumps up to a position as indicated by dots-and-dash line 134 so that the image of a sheet original passing below the glass 54 may be projected upon the drum 48.

Figure 8:
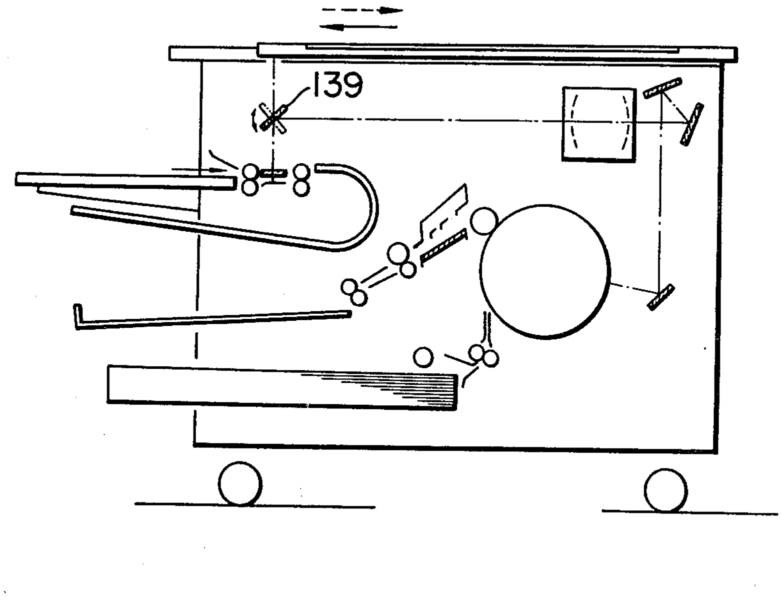

FIG. 8 shows a third embodiment of the present invention, which is substantially similar to the second embodiment with the exception that a mirror 139 is rotatable through 90° to effect the change-over between two optical paths.

Figure 9:
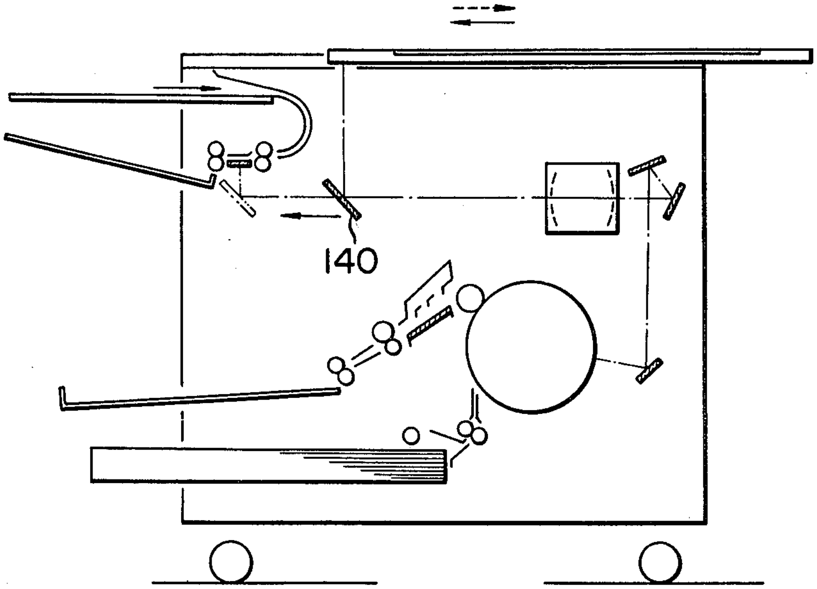

FIG. 9 shows a fourth embodiment of the present invention. In this embodiment, a mirror 140 is horizontally movable to effect the change-over between two optical paths.

Figure 10:
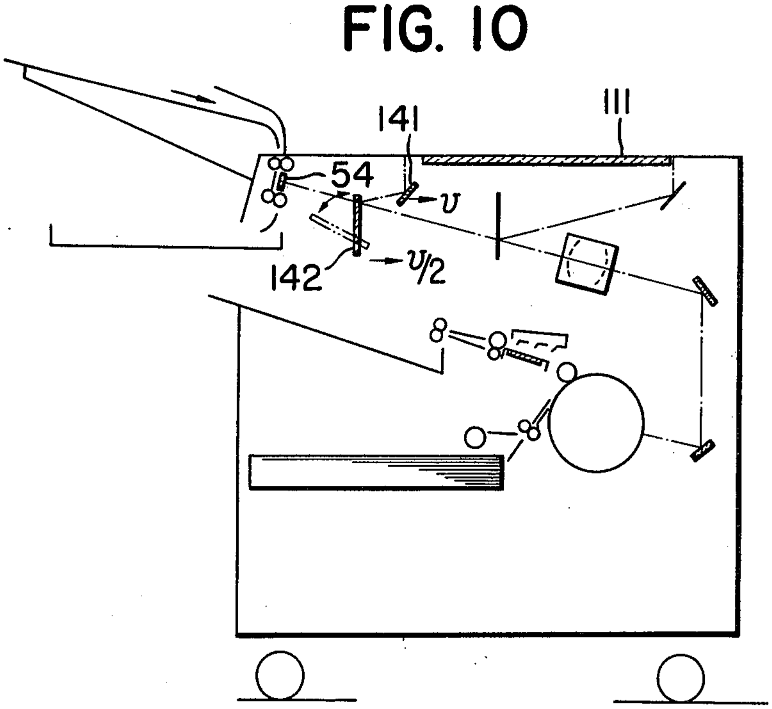

FIG. 10 illustrates a fifth embodiment of the present invention. In this embodiment, the original carriage is stationary and an original placed on the glass 111 of the original carriage may be scanned by mirrors. A mirror 141 is reciprocally movable at a velocity V and a mirror 142 at a velocity V/2. The latter mirror 142 is rotatable to effect the change-over between two optical paths.

The present invention has so far been described with respect to its application to the copying apparatus of the image transfer type, whereas the invention is not restricted to such type but is applicable to any copying machine, even of the direct type which uses sensitive paper, if it includes mirrors and lenses.

Developing Device

Figure 11:
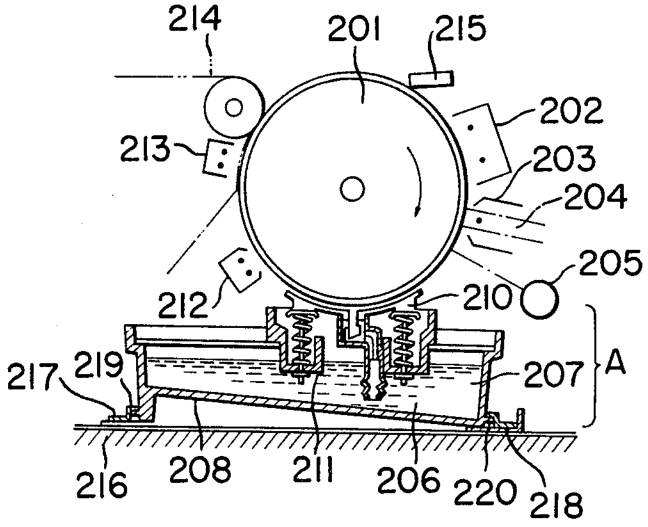
FIG. 11 is a cross-sectional view showing a developing device and photosensitive drum according to the prior art.
Figure 12:
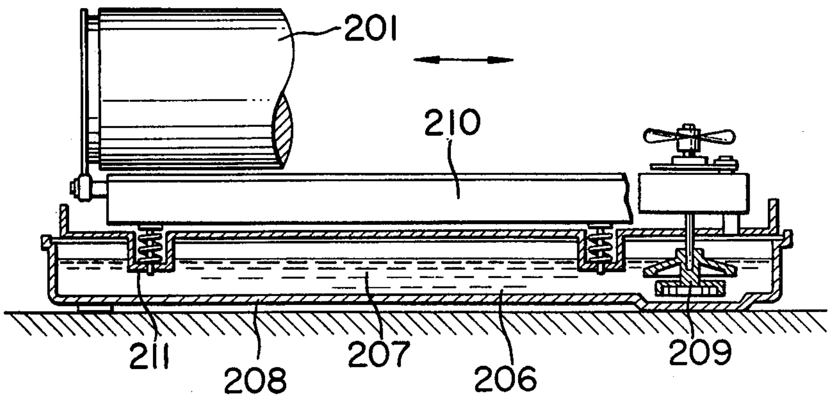
FIG. 12 is a transverse cross-section of the developing device shown in FIG. 11.

Referring to FIGS. 11 and 12, a photosensitive drum 201 comprises a photosensitive layer covered with a transparent insulating layer and is rotatable in clockwise direction. The photosensitive drum 201 is positively charged by a primary charger 202 and, where the drum reaches an exposure portion 204, it is slit-exposed to the image of an original and simultaneously therewith, it is subjected to AC discharge or secondary charge of the opposite polarity to that of the primary charge, by a discharger 203. Subsequently, the drum is subjected to an overall exposure by a lamp 205 to thereby form an electrostatic latent image on the surface of the photosensitive drum, whereafter the drum enters a developing device 206. The developing device 206 comprises a container 208 for developing liquid 207, a pump 209 for agitating and raising the developing liquid 207, and a developing electrode 210, which is adapted to be urged toward the photosensitive drum 201 by springs 211 with a slight clearance maintained with respect to the drum 201. The electrostatic latent image formed on the photosensitive drum 201 is developed into a visible image by the toner in the developing liquid raise over the developing electrode 210 by the pump 209.

Next, the photosensitive drum 201 is charged by a post-charger 212, whereby any excess developing liquid on the drum 201 may be squeezed out without disturbing the formed image. Subsequently, a sheet of transfer paper P delivered from a paper feeding portion i's brought into intimate contact with the photosensitive drum 201 and, being charged by a transfer charger 213, the image on the photosensitive drum 201 is transferred onto the transfer paper P, whereafter the transfer paper P is directed to a drying-fixing portion by a separator belt 214. The photosensitive drum 201 is wiped by a blade cleaner 215 urged thereagainst to remove any residual toner and developing liquid, whereafter another cycle of operation is repeated.

Plate-like angles 217 and 218 are attached to the bottom 216 of the copying apparatus and engaged with projections 219 and 220 of the developing device 206 and slidable in the direction of arrow in FIG. 12.

To withdraw the developing unit A from the copying apparatus body, the developing electrode 210 is lowered against the force of the springs 210 to provide a sufficient spacing between the photosensitive drum 201 and the developing electrode 210 to permit withdrawal of the developing unit, whereby the developing unit A can be slidden by the cooperation between the plate-like angles 217,218 and the projections 219,220 for removal from the apparatus body.

Circulation of the developing liquid between the developing electrode and the developer container will first be described.

Figure 14:
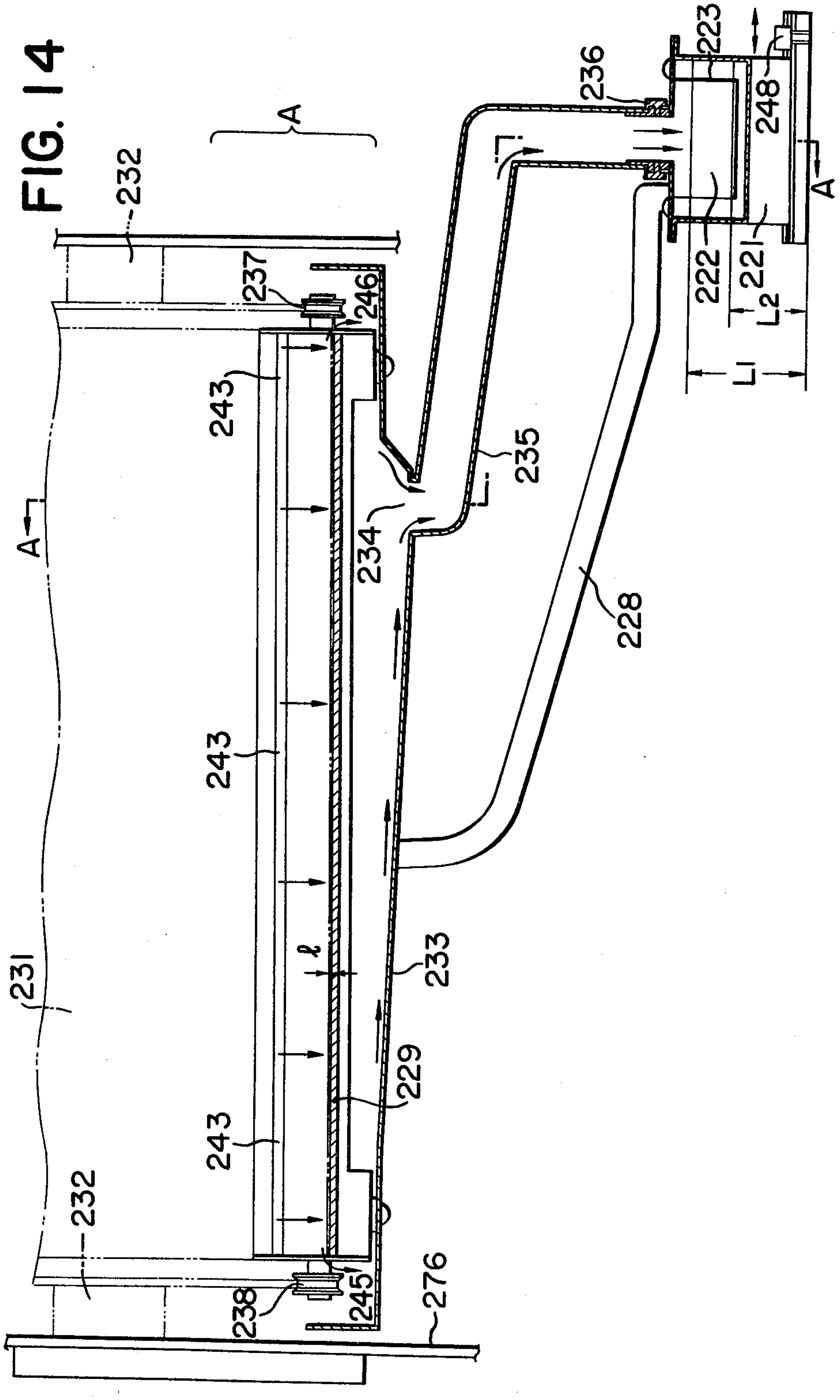
FIG. 14 is a transverse cross-section of the FIG. 13 device.

In FIG. 13, the developer container is designated by 221 and stores therein developing liquid 222, which may be filtrated through a filter 223. A motr 224 is provided with an impeller 225 for supplying the developing liquid 222 to a developing electrode portion A. A pump casing 226 has an outlet port 227 formed in a portion thereof, which outlet port is connected to a pipe 228, which has the other and releasably connected to a connector 230 of a developing electrode (which will later be described) located in the developing electrode portion A. The photosensitive drum, designated by 231, has thereon a photosensitive medium comprising a photosensitive layer covered with a transparent insulating layer, and is supported by a shaft 232. The photosensitive drum is surrounded by various means and devices for the formation of electrostatic latent image (which are similar to those shown in FIG. 11). Disposed below the photosensitive drum 231 is an arcuate developing electrode 229 which is capable of applying a developing bias voltage to the surface of the photosensitive drum with a spacing l with respect to the latter. A dish 233 is provided for receiving the developing liquid supplied to the developing electrode 229 to develop the electrostatic latent image, and has an outlet 234 formed in the bottom thereof at the forward end. Connected to the outlet 234 is a drain pipe 235, the other end of which is removably connected to a connector 236 of the developer container 221. The dish 222, as shown in FIGS. 13 and 14, is formed with a sloped surface for helping the developing liquid to form a stream and for preventing the toner from precipitating on the wall of the dish. Spacer rolls 237 and 238 are disposed in contact with the photosensitive drum 231 and maintain a clearance l between the photosensitive drum and the developing electrode 229. A fog removing roller 239 is provided to remove the fog from the formed image. The stream of the developing liquid will now be described.

When the copying apparatus is not in operation, the motor 224 is stopped and the liquid in the developer container 221 is at the level $L_1$. Thus, the filter 223 is immersed in the developing liquid to prevent the clogging of the filter which would otherwise result from solidification of toner.

Next, when the copying apparatus is operated, the motor 224 revolves in the direction of arrow, and the developing liquid is drawn into the casing 226 by the impeller 225 and passes through the pipe 228 into the developing electrode 229 to strike against a flow velocity reducing plate 242, by which the developing liquid has its flow velocity reduced and slowly passes through an opening 243 formed in the developing electrode 229 along the entire length thereof, so that the liquid fills the clearance l between the drum 231 and the electrode 239 to thereby develop the electrostatic latent image into a visible image due to deposition of toner particles on the latent image.

The developing liquid flowing out at the left side 244 of the fog removing roller 239 in FIG. 13 (the front and rear end faces 245 and 246 of the developing electrode 229 as viewed in FIG. 14) is received in the dish 233 and flows down along the sloped surface thereof to the outlet 235, from which the developing liquid falls through the drain pipe 235 while being given a sufficient energy by the head H. As part of the developing liquid in the developer container 221 reaches the developing electrode 229, the quantity of the developing liquid in the container 22 gradually decreases while part of the developing liquid begins to collect into the container through the drain pipe 224, thereby providing a constant liquid level at which the decreased and increase are balanced within the developer container. Such constant level is indicated by $L_2$. The filter 223 now exposes itself entirely out of the liquid, but the drops of developing liquid given a sufficient energy by the head H strike the exposed filter 223 to crush the toner on the filter and also prevent masses of toner or dust from sticking to the filter so as to ensure the filter to filtrate the developing liquid sufficiently. The developing liquid filtrated through the filter 223 forms a rapid flow in the developer container 221 and flows into the pumping portion. Thus, precipitation of toner can be prevented and sufficient agitation of the liquid can be ensured by the rapid flow.

It will thus be seen that, by constructing the developer container 221 and the developing electrode separately from each other and connecting them together by pipes, the volume of the developing liquid in the container can be selected as desired, in accordance with the intended purpose.

Description will now be made of a mechanism for withdrawing the developer container and developing electrode portion from the copying apparatus body. In FIGS. 13 and 14, the angle 240 is secured to the bottom surface of the developing container 221 and engaged with angles 241 and 247 secured to the apparatus body. The angle 240 is slidable in the direction as indicated by arrow in FIG. 14. The developing container 221 is secured to the apparatus body by screws 248 and, by pulling it in the direction of arrow or rightwardly, the angles 240 and 241,247 may be disengaged to permit removal of the container from the apparatus body.

Figure 15:
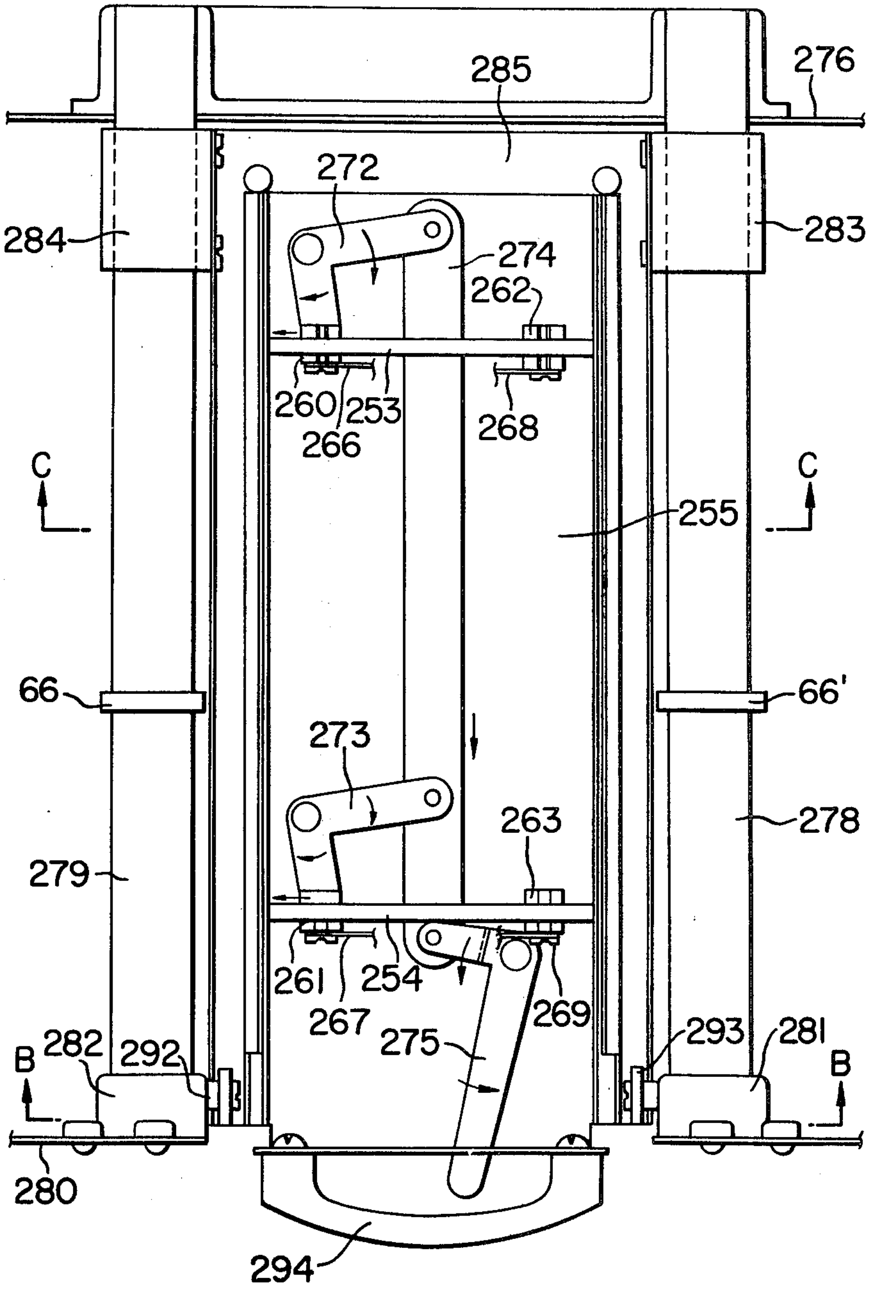
FIG. 15 is a front view of an embodiment of the lift mechanism and slide portions of the developing device.
Figure 17:
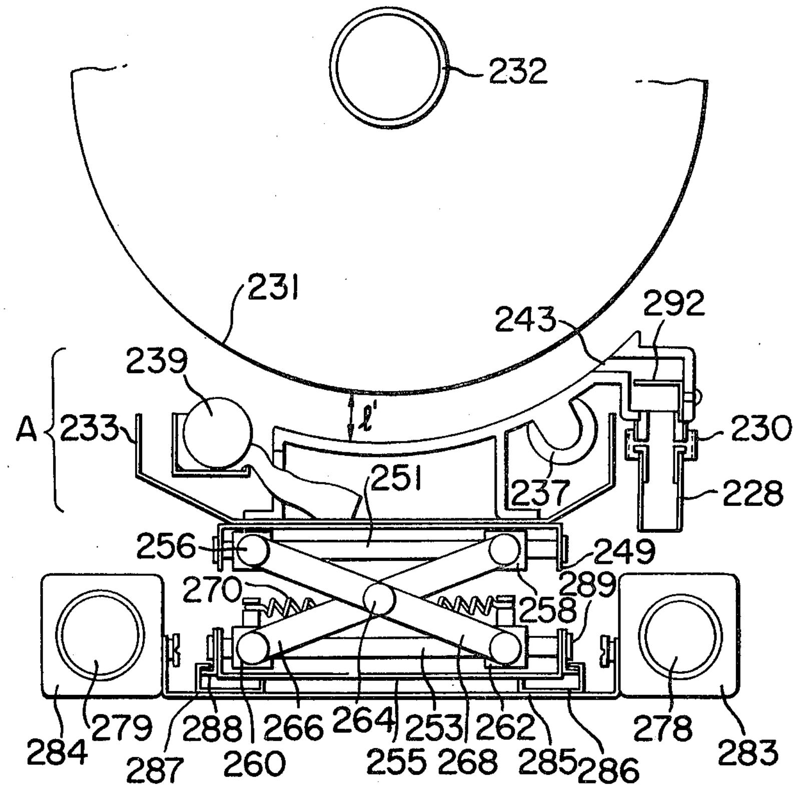
FIG. 17 is a cross-section taken along line C—C of FIG. 15.

Referring to FIGS. 15 and 17, description will now be made of the mechanism whereby a spacer roller 237 may be urged against the photosensitive drum 231 to maintain a clearance l between the drum and the developing electrode 229. Slide shaft mount plates 249 and 250 are secured to the bottom of the dish 233 and slide shafts 251 and 252 are secured to the mount plates. Likewise, slide shafts 253 and 254 are secured to a slide base plate 255. The slide shafts 251 and 252 have sleeves 256 and 257 slidably fitted thereon and have sleeves 258 and 259 fixed thereto. Likewise, slide shafts 253 and 254 have sleeves 260 and 261 slidably fitted thereon and have sleeves 262 and 263 fixed thereto. Links 266, 267, 268 and 269 of equal length intersect one another at the center and are caulked together for rotation about an axis. These links have their opposite ends pivotably secured to the sleeves 258, 259, 256, 257 and the sleeves 250, 261, 262, 263, respectively. Tension springs 270 and 271 extend between and are secured to the sleeves 261, 263 and 260. 262 to normally bias the links to their open position. Levers 272 and 273 are rotatably mounted on the slide base plate 255 and each have one end fitted to shafts (not shown) secured to the underside of the sleeves 260,261 and the other end fitted to a connector lever 274 which connects the levers 272 and 273 together. Likewise, a lever 275 is rotatably mounted on the slide plate 255 and has one end fitted to the connector lever 274 and the other end engaged with a stop provided on the bent portion of the slide base plate 255.

Because of the above-described construction, the sleeves 260 and 261 slidably fitted on the slide shafts 253 and 254 are rightwardly moved by the forces of the tension springs 270 and 271. With this, the sleeves 256 and 257 slidably fitted on the slide shafts 251 and 252 are also rightwardly moved by the links 266, 267, 268, 269 while rising in parallel to the slide shafts 253, 254. This also causes the developing electrode portion A secured to the slide shaft mount plate 250 to rise together until it is stopped with the spacer roller 237 urged against the photosensitive drum 231. This position is shown in FIG. 16.

To lower the developing electrode portion A, the lever 275 may be rotated counter-clockwise (the direction of arrow) to thereby cause the connector lever engaged with the lever 275 to move toward this side in FIG. 15 (the direction of arrow). This in turn causes the levers 272 and 273 engaged with the connector lever 274 to be rotated clockwise (the direction of arrow), which also causes the sleeves 261 and 262 slidably fitted on the slide shafts 253 and 254 to slide leftwardly (the direction of arrow) against the forces of the springs 270 and 271. Thereupon, the sleeves 256 and 257 slidably fitted on the slide shafts 251 and 252 are also leftwardly moved by the links 266, 267, 268, 269 while lowering in parallel to the slide shafts 253 and 254. When the photosensitive drum 231 is withdrawn along the shaft 232, the developing electrode portion A is lowered until there is provided a sufficient clearance l' to keep the spacer roller 237, the fog removing roller 239 and the like off the drum, whereupon the developing electrode portion A is stopped at its lowered position, against the forces of the springs 270 and 271, by the stop provided on the bent portion of the slide base plate 255.

Figure 16:
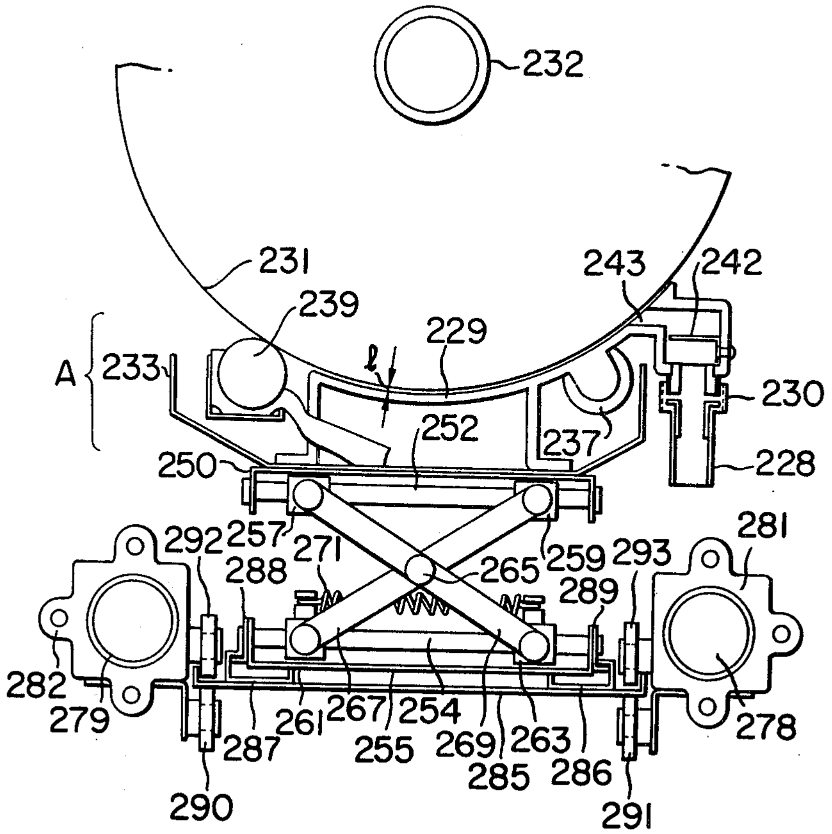
FIG. 16 is a cross-section taken along line B—B of FIG. 15.
Figure 20:
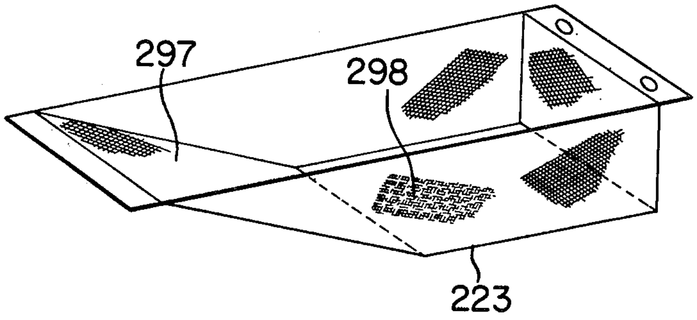
FIG. 20 is a perspective view of a filter member.
Figure 18:
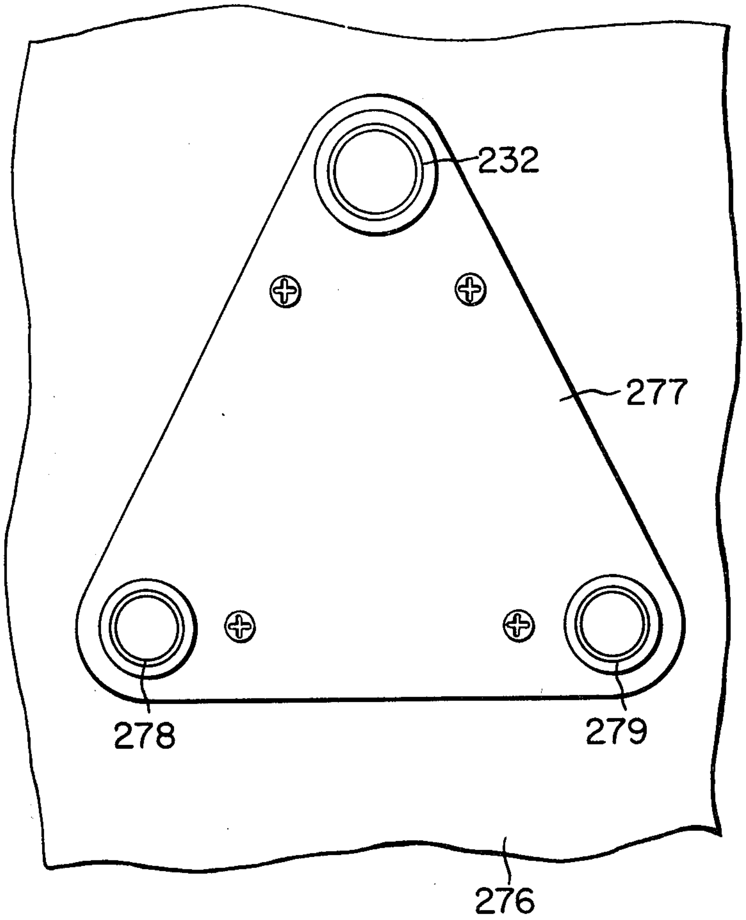
FIG. 18 is a view taken from D in FIG. 15 (or from the rear side plate).

In FIGS. 16 and 18, a rear side plate 276 has secured thereto a reinforcing casting 277 which provides reinforcement of both the rear side plate 276 and the photosensitive drum shaft 232. Further, reinforcing struts 278 and 279 also for reinforcement of the rear side plate 276 and the drum shaft 232 are secured to support castings 281 and 282 which have the opposite ends secured to the reinforcing casting 277 and a front side plate 280, respectively.

Slide castings 283 and 284 are slidably fitted to the reinforcing struts 278 and 289 and have a slide base plate 285 attached thereto. Two angles 286 and 287 are spot-welded to the upper surface of the slide base plate 285 and slidably engaged with the bent portions 288 and 289 of the slide base plate 285.

Two pairs of rollers 290,291 and 292,293 are rotatably mounted on the reinforcing strut castings 281 and 282 secured to the front side plate 280, and the slide base plate 285 is held between the rollers 291 and 293 and between the rollers 290 and 292. The slide base plate 255 is provided with a handle 294, and stops 295 and 296 are secured to the reinforcing struts 278 and 279.

Figure 19:
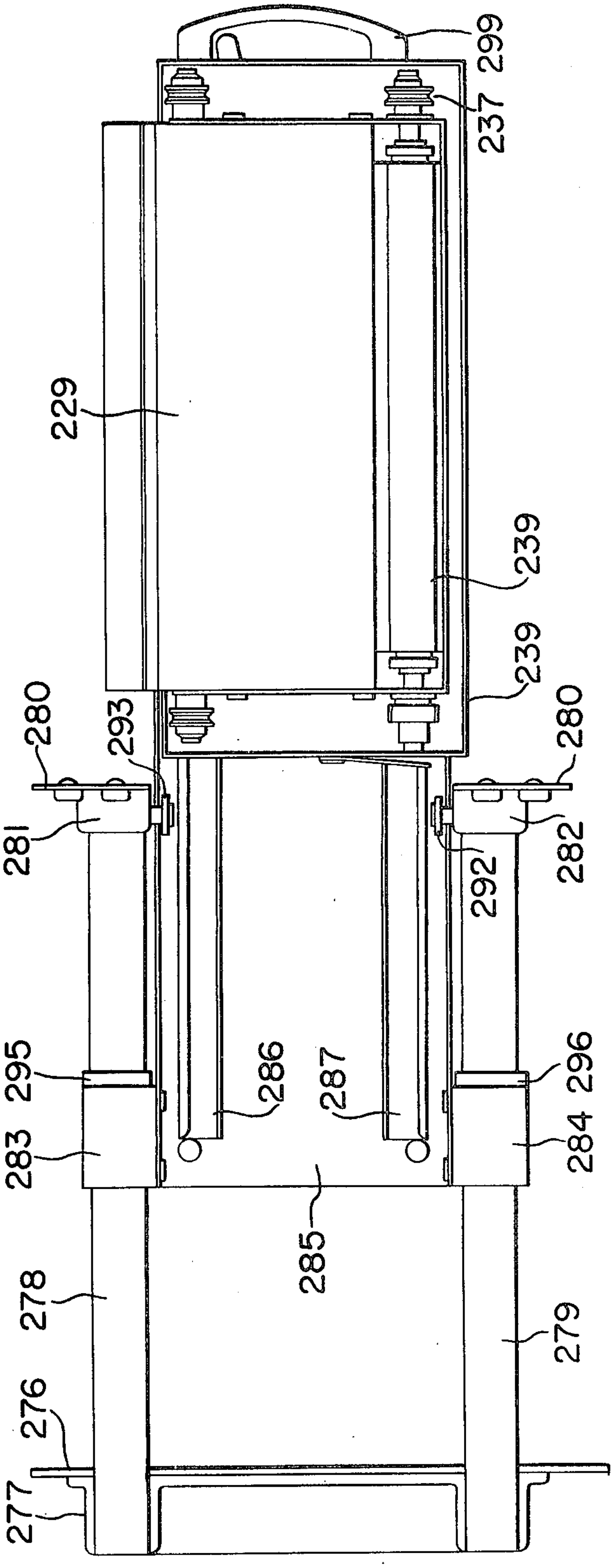
FIG. 19 is a front view of the developing device with the developing electrode portion thereof withdrawn.

In the above-described construction, to withdraw the developing electrode portion A out of the apparatus body, as described previously, the developing electrode portion A is first lowered, and then withdrawn by gripping the handle 294, whereby the slide base plate 255 slides in the engagement portions between the bent portions 288,289 and the angles 286,287 on the slide base plate 285 to come out toward this side in FIG. 15, until it is stopped on its way by a stop (not shown), whereupon the slide base plate 285 now comes out with the slide casting 283 and 284 and slidably fitted to the reinforcing struts 278 and 279 (see FIG. 19). When the developing electrode portion A has come completely out of the front side plate 280, the end faces of the slide castings 283 and 284 strike the stops 295 and 296 on the reinforcing struts 278 and 279, thus coming to a halt.

It is to be noted that withdrawal of the developing electrode portion A requires the steps of loosening and removing the connector 236 of the drain pipe 235, loosening and removing the connector 230 of the pipe 228 in the course of withdrawal, and breaking the connection between the developer container 221 and the developing electrode portion A. As described above, the developer container and the developing electrode portion are constructed separately from each other and connected together by pipes so as to permit circulation of developing liquid, and a plate provided with a lift mechanism which is capable of maintaining a constant clearance between the developing electrode portion and the photosensitive drum is slidably placed on a casting slidably fitted to two reinforcing struts which provide reinforcement of both the copying apparatus body and the photosensitive drum shaft, so that when the developing electrode portion is to be withdrawn from the apparatus body the electrode portion may first be lowered away from the photosensitive drum surface by the lift mechanism, whereafter the developing electrode portion may be pulled outwardly, whereby the plate carrying thereon the developing electrode portion and the lift mechanism is slidingly withdrawn until stopped by stops provided on the plate secured to the casting slidably fitted to the reinforcing struts, whereupon that plate may now slide along the reinforcing struts and the developing electrode portion may stop at a position projected outwardly of the apparatus body.

In such position, the developing device permits its servicing, inspection, repairs, etc. to be done with great ease and high efficiency as well as quickly and accurately, thus facilitating to maintain the performance of the apparatus.

Also, the separate connections of the developer container and the developing electrode portion contribute to the ease with which the developing device is handled, serviced, inspected, repaired or otherwise treated.

In the developing device constructed as described above, when the apparatus is not in operation or when the motor 224 is not rotating, the developing liquid 222 in the container 221 maintains the liquid level $L_1$. As a result, the filter 223 is fully immersed in the developing liquid 222 so that the filter 223 is prevented from clogging which would otherwise result from solidification and deposition of toner on the filter due to evaporation of the developing liquid. Next, when the apparatus is operated, the motor 224 revolves in the direction of arrow so that the developing liquid is drawn into the casing 226 by the impeller 225 and passed through the outlet 227 and the conduit 228 into the developing electrode 229, and impinges on the projected end 242, whereby the flow velocity of the developing liquid is reduced. Then, the liquid slowly discharges through the opening 243 extending lengthwise of the photosensitive drum 231 and fills the slight clearance l between the drum 231 and the developing electrode 229 to develop the electrostatic latent image on the photosensitive drum 231. The developing liquid overflown from the developing electrode 229 is received in the dish 233 and flows down along the sloped surface of the dish to concentrate in the opening 234, from which the liquid falls through the drain pipe 235 while being given an energy by the head H, and strikes against the filter member 223 in the developer container 221. With the start of the apparatus, the developing liquid 222 begins to circulate through various parts so that the liquid level in the developer container 221 is gradually decreased to a predetermined level $L_2$. In such state, the filter member 223 emerges fully out of the liquid and struck by the falling developing liquid given a sufficient energy by the head H. Thus, any solidified toner masses are again dispersed and the toner masses or dust may be prevented from sticking to the filter member, which can thus perform its filtrating function sufficiently. The developing liquid 222 passed through the filter member forms a rapid flow in the developer container 221 and flows into a pumping portion to prevent precipitation of toner, while the rapid flow is again useful to provide a sufficient agitating effect. It will be noted that the developing liquid which falls onto the filter member 223 strikes against the sloped surface portion 297 to the filter member 223 to force dust or other impurities from such sloped surface portion 297 to the flat surface portion 298 for accumulation thereon. The filter member may be removably mounted to facilitate its replacement or cleaning.

In other words, the construction is such that a member for dispersing toner masses is interposed between the developing portion and the liquid container of the liquid developing device so as to permit the developing liquid to circulate through said member. This enables any toner masses created in the developing liquid to be re-dispersed by said member to provide sufficiently filtrated and mixed developing liquid. In the illustrated embodiment of the apparatus, if the apparatus remains inoperative for a long time, the developing liquid on the developing electrode 229 and the dish 233 will evaporate and the toner in the liquid will solidify to form relatively large masses. When the apparatus resumes its operation, these relatively large masses of toner will be washed away by and mixed with the developing liquid, but the toner masses will pass through the drain pipe 235 to strike against the dispersing member and be finely crushed thereby, with a result that no large toner mass will be contained in the liquid supplied to the developing portion A. Further, any large toner masses captured by said member will be finely crushed due to the continuous fall of the developing liquid. Thus, according to the present invention, any toner masses may be finely crushed and redispersed and the filtration of the developing liquid may be fully accomplished, thereby eliminating such disadvantages as unevenness of the resultant copy images and injuries imparted to the photosensitive medium.

Although the above embodiments have been described with respect to an electrophotographic copying apparatus using a photosensitive medium, it will be obvious that the invention is also applicable to copying machines of the fax type which use sensitive paper.

Figure 21:
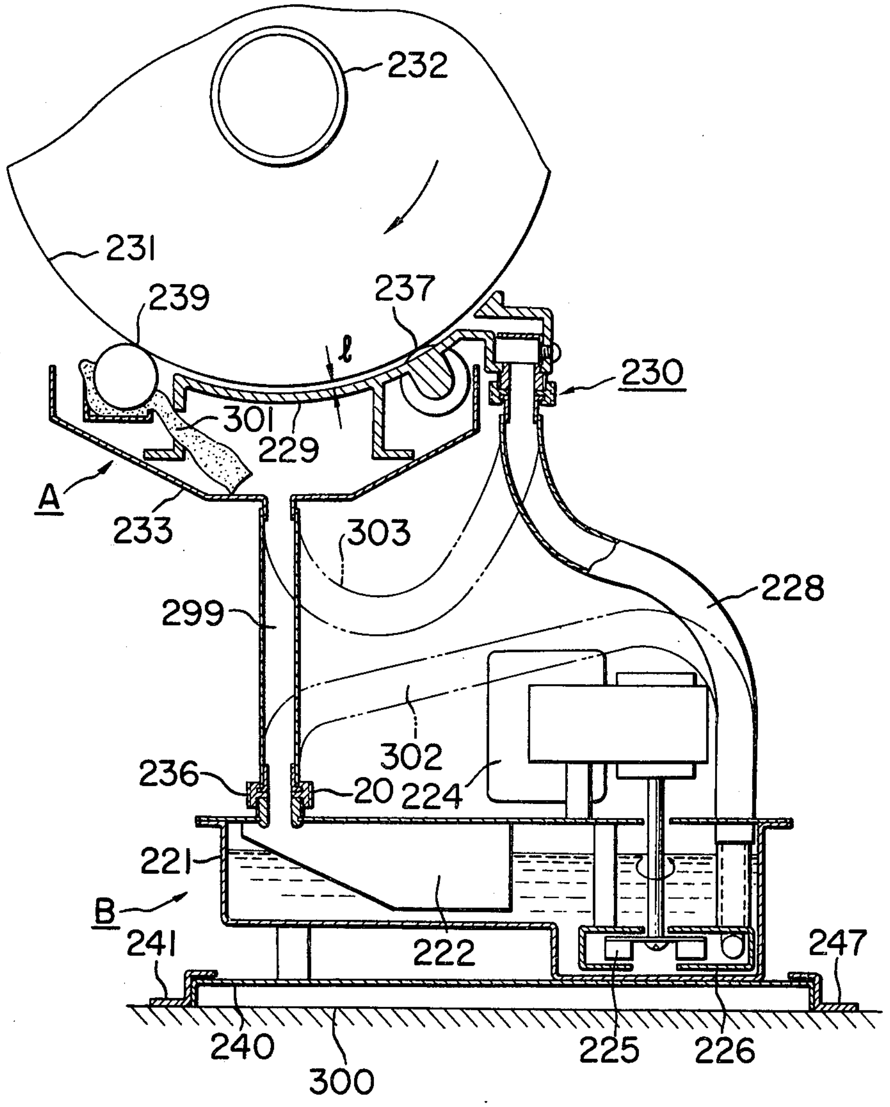
FIG. 21 shows another embodiment of the developing device.

Referring now to FIG. 21, the photosensitive drum 231 is surrounded by various means for forming an electrostatic latent image corresponding to the image of an original and means (not shown) for transferring the image, developed by developing portion, to transfer paper. The developing device for developing the electrostatic latent image into a visible image comprises individually constructed developing portion A and developer container portion B, which are connected together by a supply pipe 228 and collection pipe 299. The developing liquid 222 in the container 221 forming the container portion B is drawn into the casing 226 by the impeller 225 rotated by the motor 224, and is delivered to the developing portion A through the supply pipe 228. The developing liquid is then directed to the developing electrode 229 forming the developing portion A, to thereby develop the electrostatic latent image on the photosensitive drum 231 into a visible image. The developing liquid 222, which has thus been used for the development of the electrostatic latent image, is collected in the dish 233 and falls into the container 221 through the collection pipe 299. Further, the angles 241 and 247 secured to the copying apparatus body 300 at the bottom of the container 221 of the developing liquid container portion B are engaged with the angle 240 secured to the bottom of the container 221 and are capable of moving the container 221 in the direction perpendicular to the plane of the drawing sheet. The developing portion A is designed (not shown) such that the roller 230 is normally in contact with the outer periphery of the photosensitive drum 231 to maintain a clearance 1 between the drum 231 and the developing electrode 229 and that the outer periphery of the photosensitive drum 231 and the roller 237 may be brought out of contact with each other either by depressing the developing portion A or by raising the photosensitive drum 231, to thereby permit removal of the developing portion in the direction perpendicular to the plane of the drawing sheet. The developing portion A also includes a roll 239 effective to prevent fogging of the visualized image on the photosensitive drum 231, and a cleaning member 301 for the roll 239. Removable connectors 230 and 236 are provided on one end of the supply and collection pipes 228 and 299 each, and the removability of these connectors 230 and 236 is utilized to connect the pipes 228 and 299 in the manner as indicated by dots-and-dash lines, so as to provide independent circulation paths 302 and 303 for the developing portion A and the developer container portion B, respectively.

Figure 22:
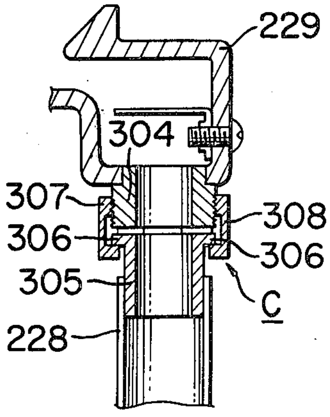
FIG. 22 illustrates the construction of the connector portion in the embodiment of FIG. 21.

An example of the construction of the above-described connector 230 will now be described in connection with FIG. 22. As shown, a connecting member 304 is fixedly secured to the developing electrode 229 as by screws or adhesive, and a connecting member 305 is also fixedly secured to the supply pipe 228. The connecting member 305 has a coupling nut 307 engaged with a projection 306, which coupling nut 307 is internally threaded for mesh engagement with the external threads formed on the outer periphery of the connecting member 304, with a result that the supply pipe 228 is communicated with the developing portion A. An anti-leakage rubber packing 308 is interposed between the two connecting members 304 and 305. Another connector portion 236 shown in FIG. 21 is similar in construction and size to the connector 230 and so, as indicated by the dots-and-dash lines in FIG. 21, the collection pipe 299 of the developing portion A is connectible to the supply port of the portion A and the supply port 228 is connectible to the collection port of the developer container. These pipes, which thus provide connection between the developing portion and the developer container portion, are designed to provide circulation paths in the individual portions, whereby these pipes will neither interfere with the removal of the developing portion A or the container portion B nor permit leakage of the developing liquid. Further, in the developer container portion B, the provision of the independent circulation path leads to the possibility of the trial operation of the container portion B.

Figure 23:
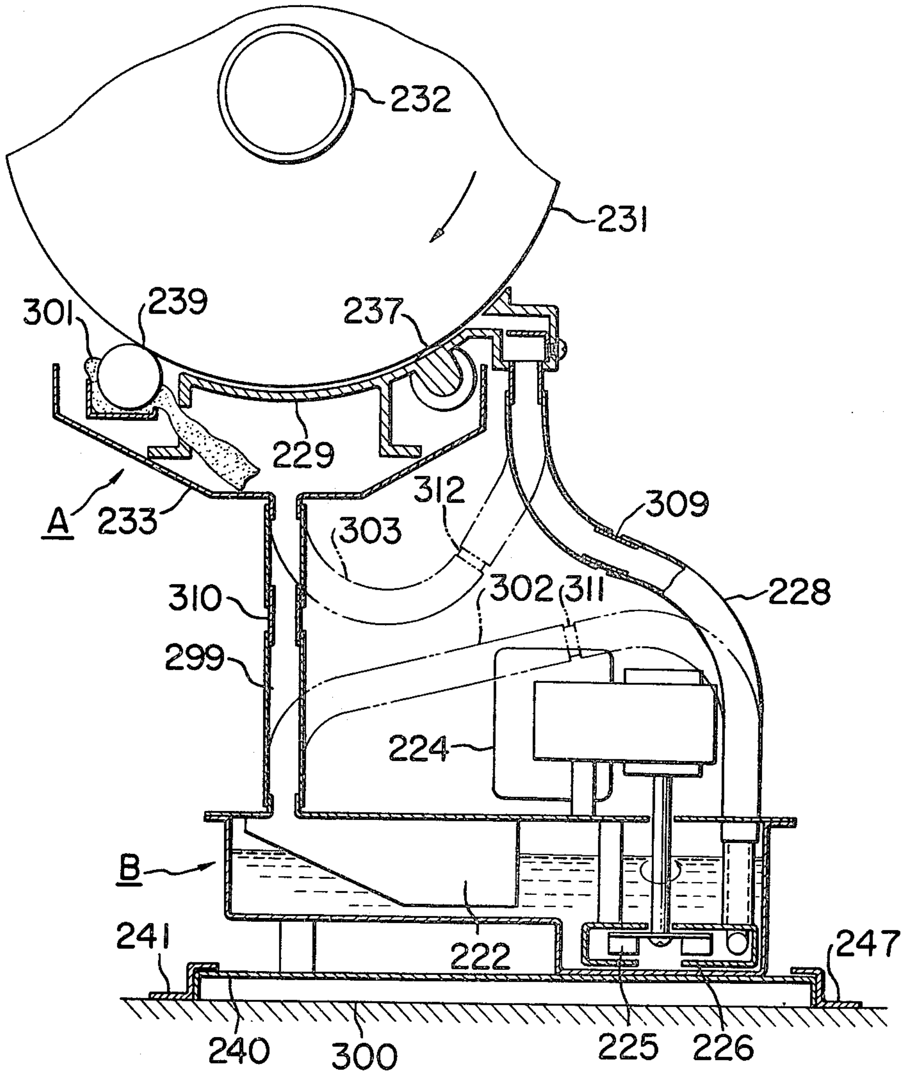
FIG. 23 shows still another embodiment of the developing device.

FIG. 23 shows a simple embodiment of the present invention. In this embodiment, as shown, the supply pipe 228 and the collection pipe 299 connecting the developing portion A and the developer container portion B are each divided into two parts, and these respective two parts are further connected together by a connecting pipe 309 or 310. In such construction, by removing the connecting pipes 309 and 310 from the supply pipe 228 and the collection pipe 299, the supply pipe 228 connected to the developing portion A and the collection pipe 299 connected to the container portion B may be connected together through a connecting pipe 309 (or 310) to provide an independent circulation path in the developer container portion B. Further, the supply pipe 228 and the collection pipe 229 connected to the developing portion A may be connected through a connection pipe 310 (or 311) to provide an independent circulation path in the portion A. The embodiment of FIG. 23 can also achieve the effect as described in connection with the embodiment of FIG. 21 and in addition, can provide the circulation paths more simply and readily than the embodiment of FIG. 21. In FIG. 23, the parts similar to those in FIG. 21 are given similar reference numerals.

According to this embodiment of the present invention, as will be appreciated, the means for connecting the developing portion for developing the electrostatic latent image to the container portion for containing the developing liquid to be supplied to the developing portion are connected so as to provide an independent circulation path in each of the two portions. With such construction, the developing portion or the developer containing portion may be removed from the apparatus body without being interfered with by the pipes and without the possibility of the developing liquid leaking from the developing portion or the container portion. Furthermore, the provision of independent circulation paths permits the trial operation of the container portion to be effected.

It is to be noted that the supply pipe or the collection pipe, when one end or a part thereof has been removed to make the container portion and the developing portion independent from each other, may be fixed by hook or like means so as to prevent outward leakage of the developing liquid. Although the above embodiment has been illustrated with respect to a developing device in the electrophotographic art using a photosensitive medium, it will be apparent that the embodiment is applicable to other developing devices such as mist developing device or diazo developing device.

Figure 24:
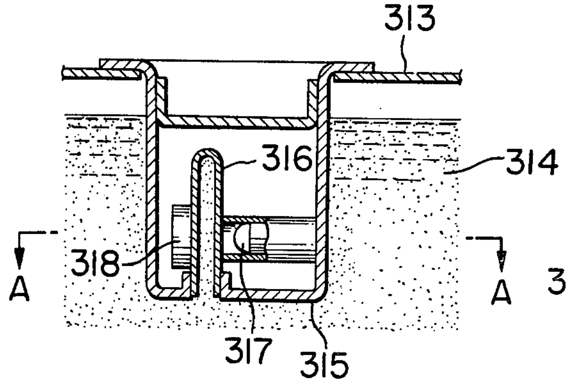
FIG. 24 is a longitudinal cross-section of the density detector device according to the prior art.
Figure 25:
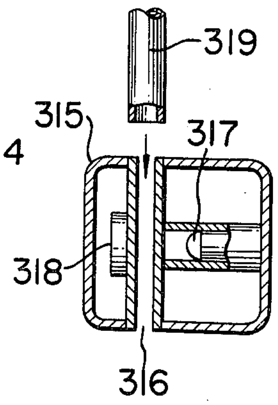
FIG. 25 is a cross-section taken along line A—A of FIG. 24.

Referring to FIG. 24, a small density detector chamber 315 is defined in developing liquid 314 within a developer container 313 and a passage 316 is formed of glass or like transparent material and extends vertically in the chamber so that part of the developing liquid to be supplied to the developing portion may be directed from an unshown pump through a conduit 319 into the passage 316. A light source 317 and a light-sensing element 318, which together form a photoelectric detector means, are disposed on the opposite sides of the passage 316 in the chamber. Even during inoperative condition of the copying apparatus, the passage 316 of transparent material is filled with developing liquid so that toner will never stick to the wall portion of the passage 316 which corresponds to the optical path. Since the developing liquid as injected from the conduit 319 is at a predetermined flow velocity, such liquid will flow through the passage 316 while diverging into a sector form. This will prevent toner from sticking to the inner wall portion of the passage 316 which is exposed to the flow of developing liquid, but the rest of the passage wall will suffer from sticking of toner. In other words, unless the light source 317 and the light-sensing element 318 were disposed at locations corresponding to the area of the passage in which the developing liquid 314 flows in a sector form, no proper density of the developing liquid will be obtained and this would necessarily lead to an increased size of the passage 316. In order that the developing liquid 314 may be directed through the conduit 319, the pumping force must be increased, otherwise the flow velocity of the developing liquid 314 would be reduced to cause toner to stick to the wall of the passage 316.

Description will further be made of a construction wherein a pumping mechanism including an impeller and a casing forming a spiral chamber is provided in developing liquid and a portion of the casing is formed with a slit-like or other opening through which the developing liquid may be directly passed to the passage in the photoelectric detector means.

Figure 26:
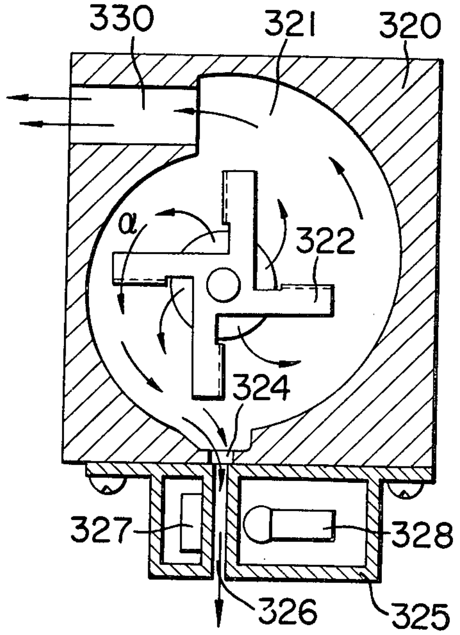
FIG. 26 illustrates the construction of an embodiment of the density detector device.
Figure 27:
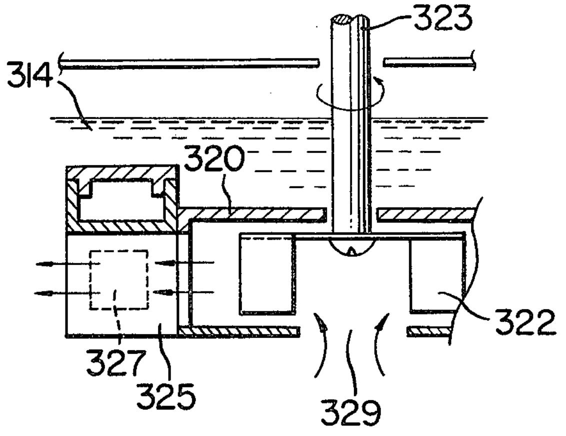
FIG. 27 is a cross-section of the FIG. 26 embodiment taken along the impeller and the slit-like opening.
Figure 28:
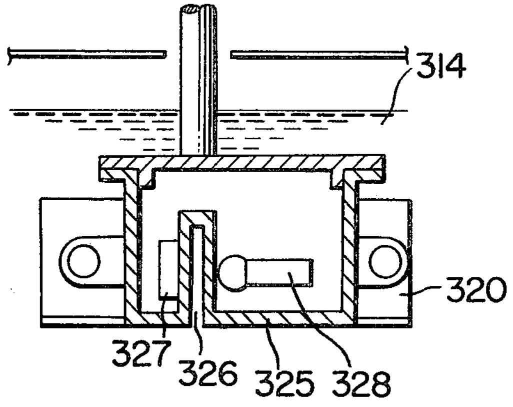
FIG. 28 is a cross-section of the photoelectric detector portion in the FIG. 26 embodiment and showing such detector portion and the slit portion.

Referring to FIGS. 26, 27 and 28, a casing 320 forming a pump defines a spiral chamber 321 therewithin and accommodates therein an impeller 322 rotatable in the direction of arrow. The impeller 322 is directly connected to a motor shaft 323. A portion of the casing 320 is formed with a slit 324 as opening. A density detector chamber 325 accommodating therein a light source 328 and light-sensing element 327 for detecting the density of the developing liquid 314 is provided with a passage 326 formed of glass, transparent plastics or other transparent material. The passage 326 is attached to the casing 320 for engagement with the slit 324 formed in the casing 320.

In the developing liquid density detector device constructed as described, the developing liquid 314 is drawn in through the liquid intake port 329 of the case 320 by rotation of the impeller in the direction of arrow $\alpha$ and the pressure of the drawn liquid is increased in the spiral chamber 321 to increase its flow velocity, and then the liquid is delivered through the opening 330 to the developing portion (not shown) for developing an electrostatic latent image. Likewise, the developing liquid 314 is also injected rapidly through the slit 324 to the passage 326 in the photoelectric detector means.

Since the developing liquid injected from the spiral chamber 321 is delivered through the slit 324 to the passage 326 in the photoelectric detector means while keeping a great width of flow but without the flow velocity thereof being reduced, toner will never stick to the transparent wall portion of the passage 326. Even if toner should stick to the wall portion of the passage 326 during down-time of the copying apparatus, such toner may readily be removed by the developing liquid rapidly flowing out of the slit 324, thus ensuring proper density detection of the developing liquid to be achieved. In addition, the developing liquid 314 flows out at a high velocity in accordance with the shape of the slit 324, and this enables the size of the detector chamber 325 to be minimized.

To maintain the developing liquid at a constant density by the use of the above-described density detector device, use may be made of an electric circuit for operating a toner supply valve by a signal from, for example, the light-sensing element 326 and light source 328 forming the photoelectric detector means. More specifically, a switching transistor may be operated by the voltage at the junction between the resistance of the light-sensing element 327 and a regulating resistance to permit a current to flow to an electromagnetic solenoid to operate the valve.

Fixing Device

Figure 29:
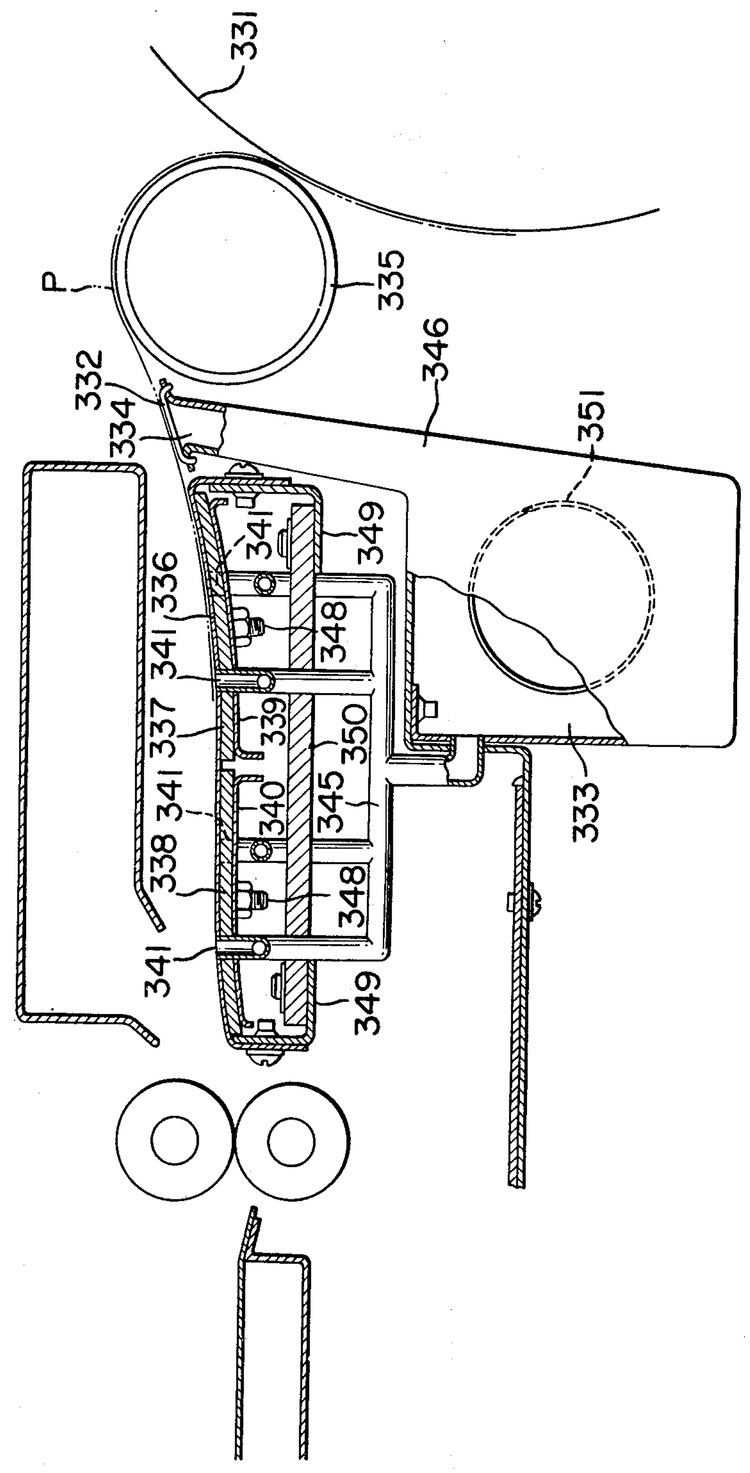
FIG. 29 is a cross-sectional view of the drying-fixing device.

FIG. 29 shows a copying machine of the transfer type in which a liquid-developed image on the surface of a photosensitive drum 331 is transferred to copy paper (transfer paper) P, which is then directed over a separator roll 335 onto a heating plate of a drying-fixing portion. The heating plate is not restricted to the shown form, but the heating plate 336 has mica-enclosed plate-like electrical heaters 337,338 and support plates 339,340 secured to the back or lower side thereof by bolts and nuts 348, and they are supported on a support frame 350 by means of mounting leg 349. The upper surface of the heating plate 336 is shown to comprise a first concave surface portion and a second convex surface portion, with some possible warping of copy paper during heating being taken into account.

The surface of the above-described heating plate 336 (including the front and rear extension surfaces) may be formed with one or more holes 341 and grooves 334 (FIG. 29), or alternatively the front and rear portions of the surface of the heating plate 336 may be formed with grooves 342–344 (FIG. 30), and these openings may be communicated with a suction source through ducts 345–347.

In FIG. 29, when the copy paper P has reached the intake groove 334 via the separator roll 335, the copy paper is attracted to a guide line (or netting) 332 by air drawn from the groove 334 by a blower 351 through an intake regulating chamber 333 and duct 346 while the copy paper is advanced riding onto the inlet end of the heating plate 336 located on the extension of the guide line. Since a number of holes 341 are alternately formed in the surface of the heating plate, the copy paper P is advanced with the leading and trailing edges thereof attracted into intimate contact with the heating plate surface by the suction force from these holes. Thus, the copy paper P, which would tend to be curled by heating, is brought into intimate contact with the heating plate by the suction so that the copy paper can be subjected to heating effect by the entire surface of the heating plate, with a result that a sufficient drying and fixing effect is attained through a relatively short distance of travel.

When no copy paper is present on the drying-fixing device, even if the suction blower 351 is in operation, most of the drawn air will pass through the intake groove 334 and only very little of the air will pass through the intake port 341, because the intake groove 334 has a cross-sectional area much greater than that of the intake port 341 and because the duct 345 is bent with respect to the intake port 341 to provide a great line resistance. Therefore, the temperature fall of the heating plate which would result from the provision of the intake port 341 is substantially negligible. Also, when a sheet of copy paper P has been conveyed there to cover the intake port 334, the amount of air drawn in through the intake port 341 will be increased and the air will strongly attract the copy paper P at a point of time whereat the paper has reached the intake port, thereby bringing the copy paper into intimate contact with the heating plate for efficient drying and fixing.

Figure 30:
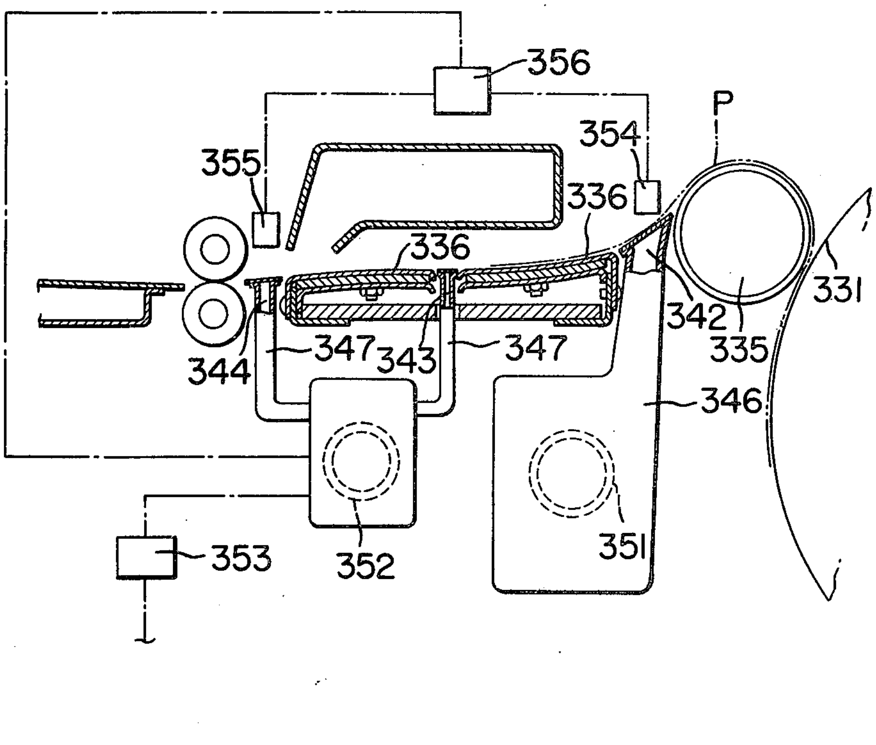
FIG. 30 is a cross-sectional view of a modification thereof.

FIG. 30 shows an embodiment wherein in lieu of the intake port 341 in the surface of the heating plate, elongated intake grooves 343 and 344 are provided in the center of the heating plate surface and on the surface of the rearward extension, the grooves extending widthwise of the heating plate.

Discretely from the intake groove 342, a blower 352 is provided to ensure intimate contact of copy paper with the heating plate.

Further, by providing a suction effect only in the presence of copy paper in the drying-fixing portion, it will be possible to minimize the temperature fall of the heating plate and keep the durability of the electrical heater. For example, a control circuit 353 may be provided to operate the blowers 351 and 352 in timed relationship with the arrival of copy paper from the paper feeding cassette. Alternatively, a control 356 may be provided which is operable by a signal from an electrical sensor 354 (using CdS, microswitch or the like) for detecting the leading edge of the copy paper in the vicinity of the intake groove 334 and by a signal from a similar electrical sensor 355 for detecting the trailing edge of the copy paper just rearwardly of the heating plate.

The temperature of the heating plate may be lower than the conventional level and the distance of travel of copy paper may be shortened to achieve a sufficient drying-fixing effect and to reduce the size and weight of the device. The present embodiment is equally applicable for the fixing of copy paper in dry type copying machines.

Figure 31:
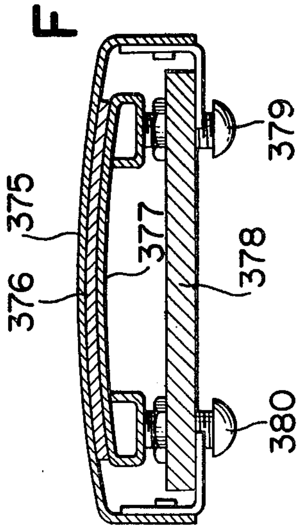
FIG. 31 is a longitudinal cross-section of the heating plate type drying-fixing device according to the prior art.

FIG. 31 shows a commonly used heater of the heating plate type. It comprises a convex-surfaced heating plate 375, a plate-like heater 376 and a support plate 377 having a curved surface similar to that of the heating plate. The heater 376 is brought into intimate contact with the heating plate 375 by bolts 379 and 380 threaded into a unitary bottom plate 378.

Figure 32:
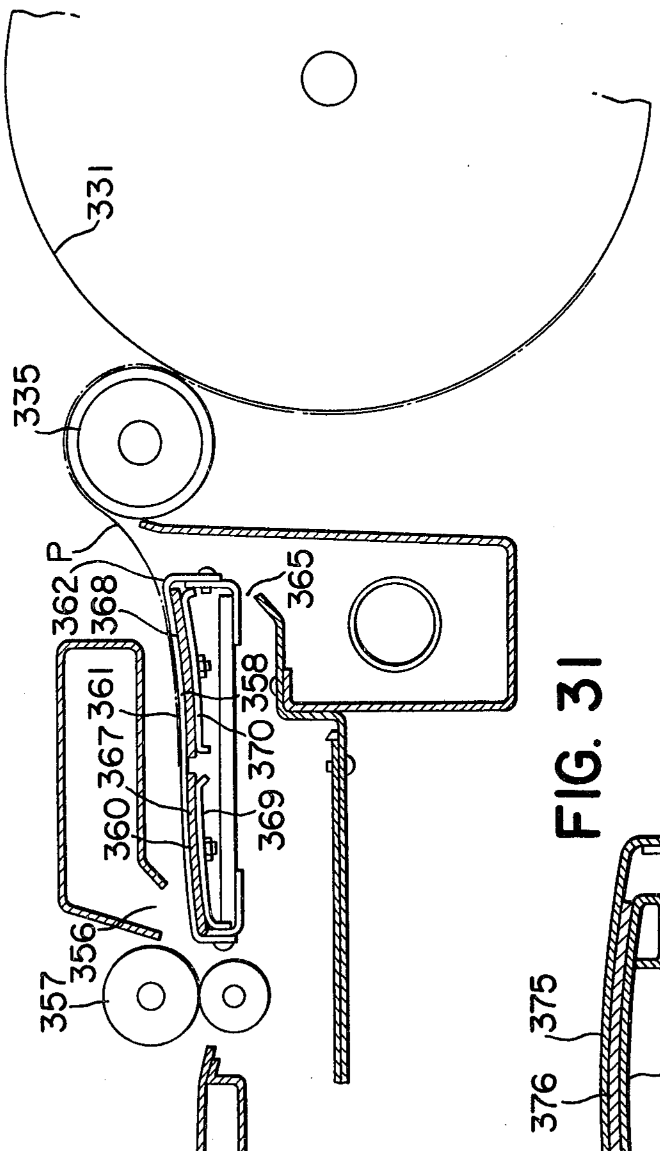
FIG. 32 is a schematic, transverse section of the conveyor portion adjacent the drying-fixing device.
Figure 33:
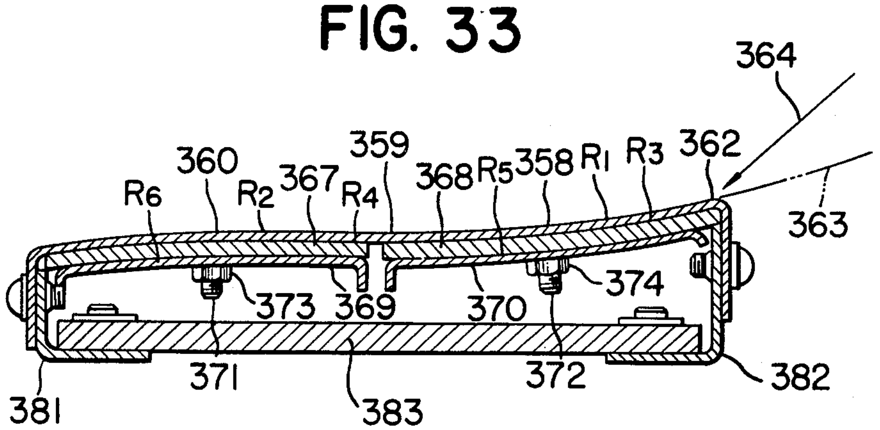
FIG. 33 is an enlarged, longitudinal section of the essential portion of FIG. 32.

The invention will now be described with respect to an embodiment as shown in FIGS. 32 and 33. The photosensitive drum is herein designated by 331, and copy paper P having an image transferred thereto from the surface of the photosensitive drum 331 is separated from the drum by a separator roll 335 and a separator belt (not shown), and then delivered onto the heating plate of the drying-fixing device A. As it passes over the upper surface of the drying-fixing device A, the copy paper P is dried and fixed by the heat from the heating plate 361 and discharged by a set of discharge rolls 357 into a tray (not shown) located outside.

In FIG. 33, the heating plate 361 is a metal plate of good heat conductivity comprising a concavely curved surface 358 of curvature radius $R_1$ which is the inlet portion for copy paper, a convexly curved surface 360 of curvature radius $R_2$ which is the outlet portion for copy paper, and a narrow flat portion smoothly interconnecting the two curved surfaces 358 and 360. The tangential line 363 at the inlet end 362 of the concavely curved surface 358 lies flush with or below the path 364 of the incoming paper, and the curvature radius $R_1$ of the surface 358 is selected such that, when the copy paper has touched the heating plate, it is urged against the heating plate and also smoothly deflected by the suction air from ports 365,366 or warm wind imparted from above the paper. The curvature radius $R_2$ of the convexly curved surface 360 is selected to a value substantially approximate to the curvature radius with which the paper is curled when heated. When the copy paper P is delivered from the separator roll 335 onto the upper surface of the above-described heating plate 361, the copy paper P first touches the inlet end 362 of the concavely curved surface 358 and is urged against such surface and deflected while being gradually heated, and advances to the flat surface portion 359. By that time, the paper will have been dried to some extent and warped inwardly. Thus, when the leading edge of the copy paper P has come to the convexly curved surface 360 past the flat surface 359, the leading edge portion of the copy paper P will lower from gravity and come into uniform contact with the convex surface 360 because the curvature radius of the convex surface 360 is approximate to that of the curled paper. The degree of intimate contact between the concavely curved surface 360 and the copy paper P may be further increased when the copy paper is drawn leftwardly and downwardly by discharge rolls.

Thus, the copy paper comes into contact with the heating plate 361 over the entire area thereof so that the heat from the heating plate continuously transfers to the copy paper to accomplish ideal drying and fixing.

Plate-like heaters 367 and 368 each comprise a plate-like nichrome wire flatly wound on a mica plate and having the opposite surfaces covered with layers of mica for insulation and protection. These heaters have dimensions corresponding to the dimensions of the curved surfaces 358 and 360, respectively.

Support plates 369 and 370 for the heaters and metal plates have dimensions substantially equal to the dimensions of the heaters. The support plate 370 has a curvature radius substantially equal to or slightly less than the curvature radius $R_3$ of the back side of the curved surface 358, and the support plate 369 has a curvature radius substantially equal to or slightly greater than the curvature radius $R_4$ of the back side of the curved surface 360.

Bolts 371 and 372 are provided substantially centrally of the curved surfaces 358 and 359 of the heating plate 361, and have one end secured to the heating plate 361. These bolts are respectively aligned with holes formed through heaters 367,368 and support plates 369,370 substantially centrally thereof, and cooperate with nuts 373 and 374 to secure the heaters 367,368 with support plates 369,370 to the heating plate. In such heater holding system, the force urging the heaters against the curved surfaces may concentrate in the centers of the heaters to thereby bend the hard mica easily and well adapt the heaters to the heating plate. Particularly unlike the case of FIG. 31 where the heating plate is fastened at the opposite ends thereof, there is no force which converts the convexity to the concavity or vice versa and this results in no deformation of the curved surfaces. Accordingly, better contact of the heater with the heating plate is provided to prevent the nichrome wire from being partly heated red and broken. Also, the overall contact established between the entire heater surface and the heating plate and the natural construction of the fastening mechanism permit the heating plate to be thin and of low heat capacity, which in turn leads to an ease of temperature control and shorter length of time required until the desired temperature is attained.

The plate-like heaters 367,368 and the support plates 369,370 need not always be separate members as shown, but may be formed integrally.

Figure 34:
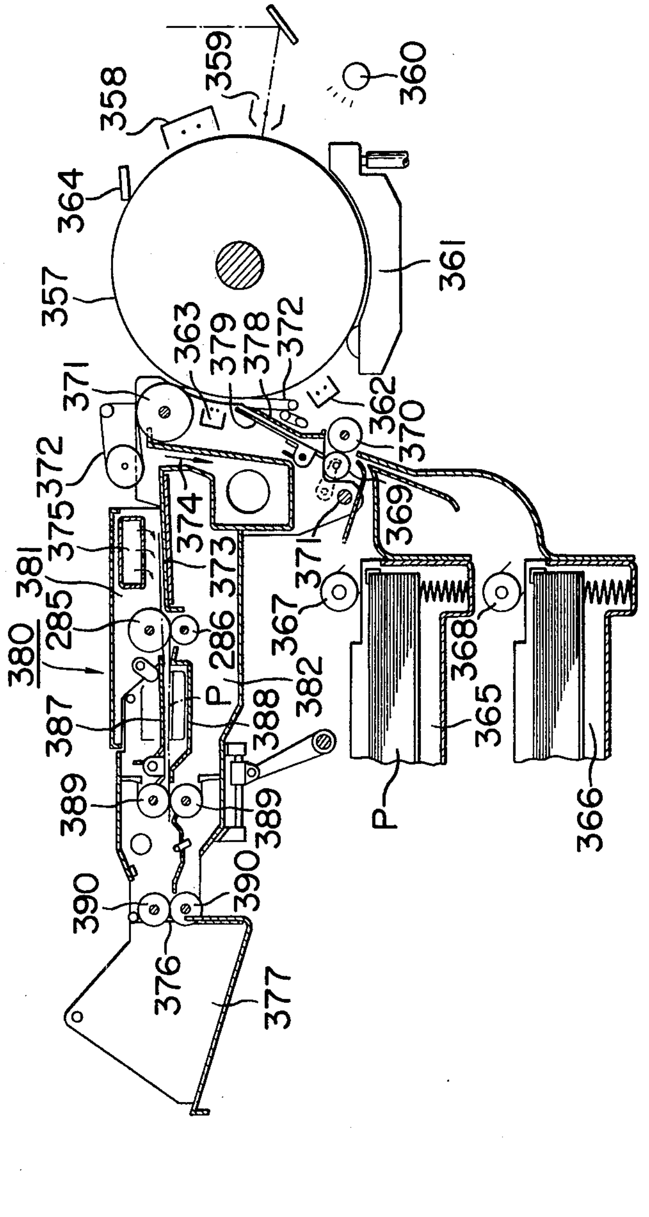
FIG. 34 is a longitudinal section of the device for opening the passage.

Referring now to FIG. 34, there is shown an example of the transfer drum type electrophotographic copying apparatus. Around a photosensitive drum 357 rotatable in the direction arrow, there are disposed various process elements such as a primary charger 358, a simultaneous image application and discharger 359, an overall irradiating lamp 360, a developing device 361, a post-charger 362, an image transfer portion 363, a residual image cleaner 364, etc.

A sheet of transfer paper P may be fed from a cassette or like paper feed box 365 or 366 by means of a roll 367 or 368 and rolls 369, 370 and, behind the post-charger 362, the paper P may be urged against the photosensitive drum 357 to have a toner image transferred thereto, whereafter the paper may be separated from the drum by a separator roll 371 and a separator belt 372 and directed onto a heating plate type fixing device 373, where the paper may be conveyed for drying and fixing while being brought into intimate contact with the heating plate 373 by the suction air from a duct 374 and by a blast of air from a duct 375, whereafter the paper may finally be discharged through a port 371 onto a tray 377. Designated by 378 and 379 are transfer paper guide passages between the set of feed rolls 369,370 and the photosensitive drum 357.

A drying-fixing portion 380 is divided into an upper portion 381 and a lower portion 382 by a copy paper passage, and these two portions are coupled together by links 383 and 384. A transport roll 285 and a blow-out duct 375 are mounted within the upper portion 381, and a charger 363, transfer paper separator roll 371, belt 372, duct 374, heating plate 373, roll 286, guide plate 387, reflector plate 388, rolls 389,390, etc. are supported within the lower portion 382.

A pivot shaft 391 is provided below and rightwardly of the lower portion 382 and pivotally mounted to a plate frame 392. A lever handle 393 is pivotally mounted on a shaft 394 to open the upper portion 381 and pivotally move the lower portion 382. A lever 395 is also mounted on the shaft 394 inside the plate frame 392. A slider 396 is mounted for oscillation on the end of the lever 395. A slide shaft 397 is provided in the lower portion 382. A lever 398 is integrally formed with the link 383 and has a slot 399 formed therein. A pin 400 is provided on the plate frame 392 and engaged in the slot 399.

Figure 35:
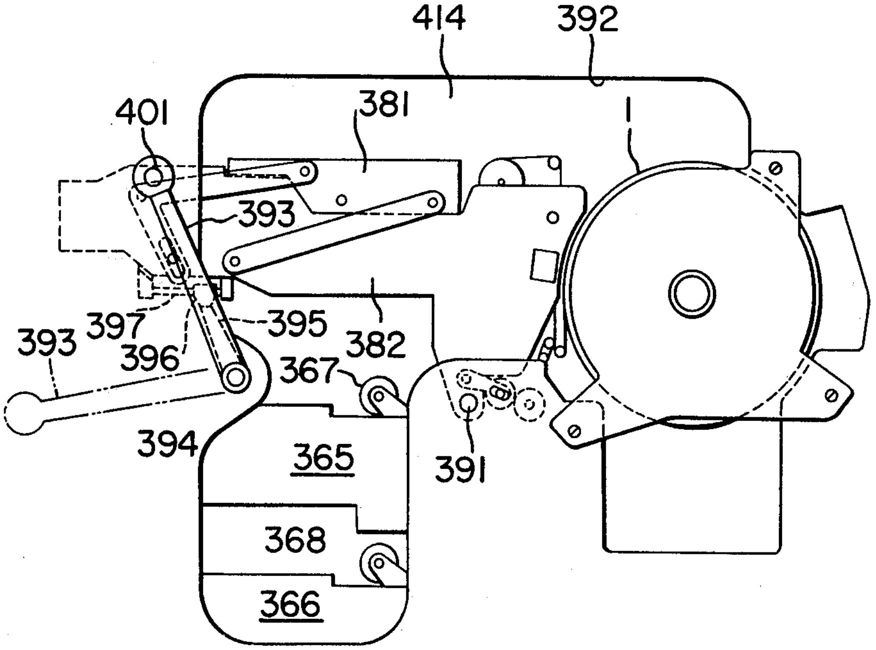
FIG. 35 is a front view thereof.
Figure 36:
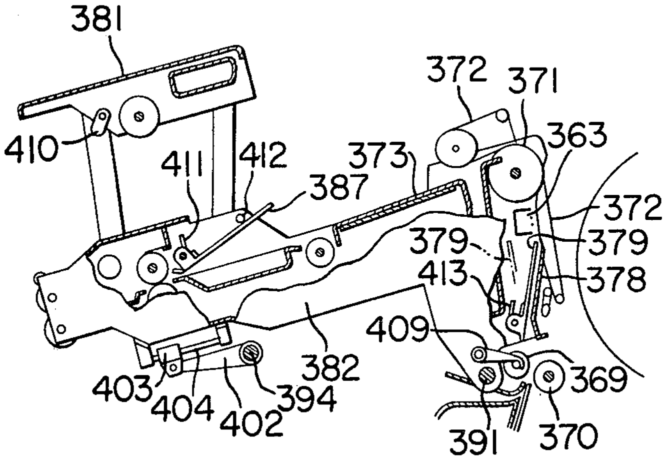
FIG. 36 is a longitudinal section showing the passage in open position.
Figure 37:
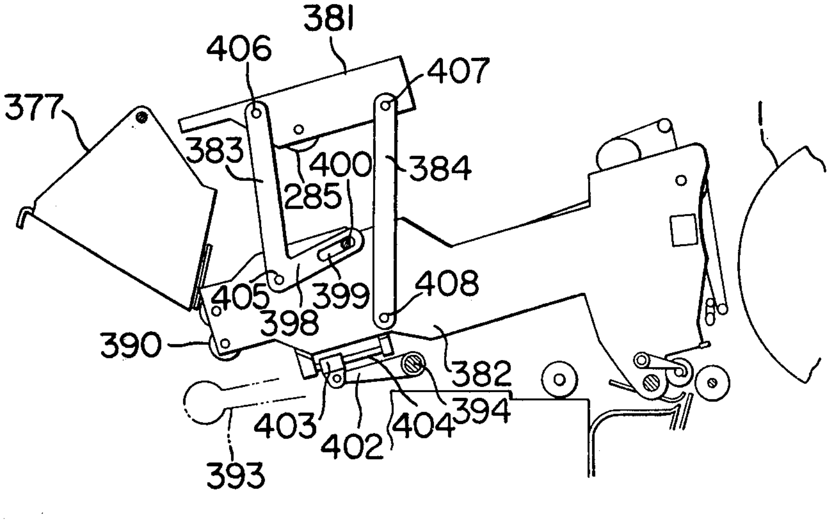
FIG. 37 is a front view showing the passage in open position but with the front plate frame removed.

In FIGS. 34 and 35, the upper and lower portions 381 and 382 are closed and the image transfer portion 363 is maintained in its proper position relative to the photosensitive drum 357. Slight withdrawal of the knob 401 of the lever handle 393 may cause the lever handle to be disengaged from the mating hole in the plate frame 392. By pivoting the lever handle counter-clockwise to the position indicated by dots-and-dash line, the lever 402 will cause the slider 403 and slide shaft 404 to pivot the lower portion 382 downwardly about the shaft 391 and incline the same away from the photosensitive drum 357 as shown in FIGS. 36 and 37.

As the lower portion 382 is so inclined, the lever 398 is cocked by the pin 400 on the plate frame to cock the link 383 to substantially upright position about the pivot pin 405 by which the link is pivotally mounted to the lower portion. This also causes the parallel link 384 to cock upright, whereby the upper portion 381 is lifted high with respect to the lower portion 382, as shown in FIGS. 36 and 37.

Also, as the lower portion 382 is inclined, a pawl 409 near the pivot shaft 391 moves the shaft of the transport roll 369 to separate this roll from its partner roll 370. Further, the guide plate 387 in the lower portion 382 is cocked up by a spring 411 because a keep member 410 for the guide plate provided in the upper portion 381 is separated from the guide plate. By manually pushing the guide plate 379, it may be widely separated from the guide plate 378.

Thus, a single operation of the handle 393 can widely open almost all of the paper passages from the first transport rolls 369,370 to the guide plates 378,379 and between the separator belt 372 and the photosensitive drum 357 and further between the upper portion 381 and the lower portion 382, so that anyone can easily obtain access to any of these passages through a hole 414 in the plate frame 392 of the apparatus housing to properly deal with the transfer paper if jamming should occur.

Paper Feeder Device

Figure 38:
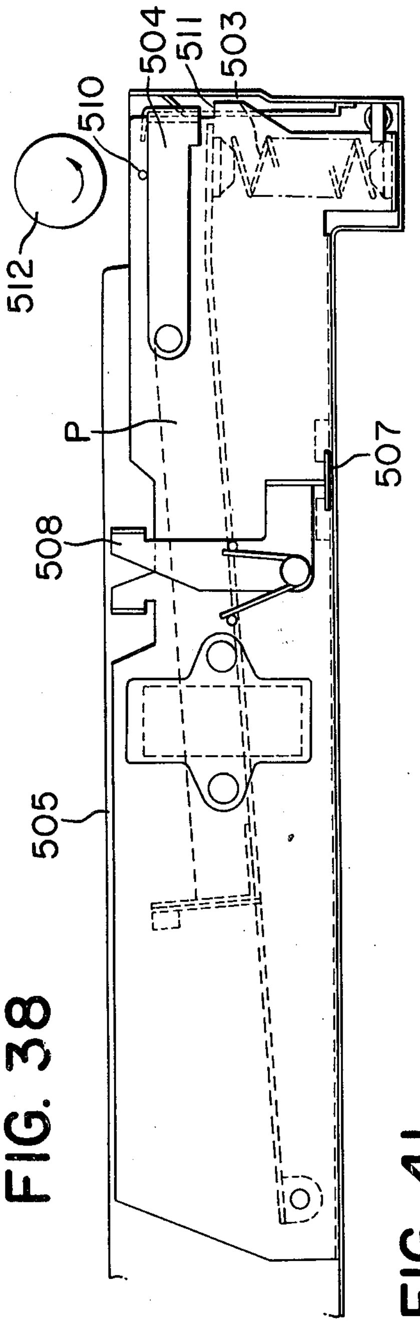
FIG. 38 is a cross-sectional view of an example of the copy paper feeder bed.
Figure 39:
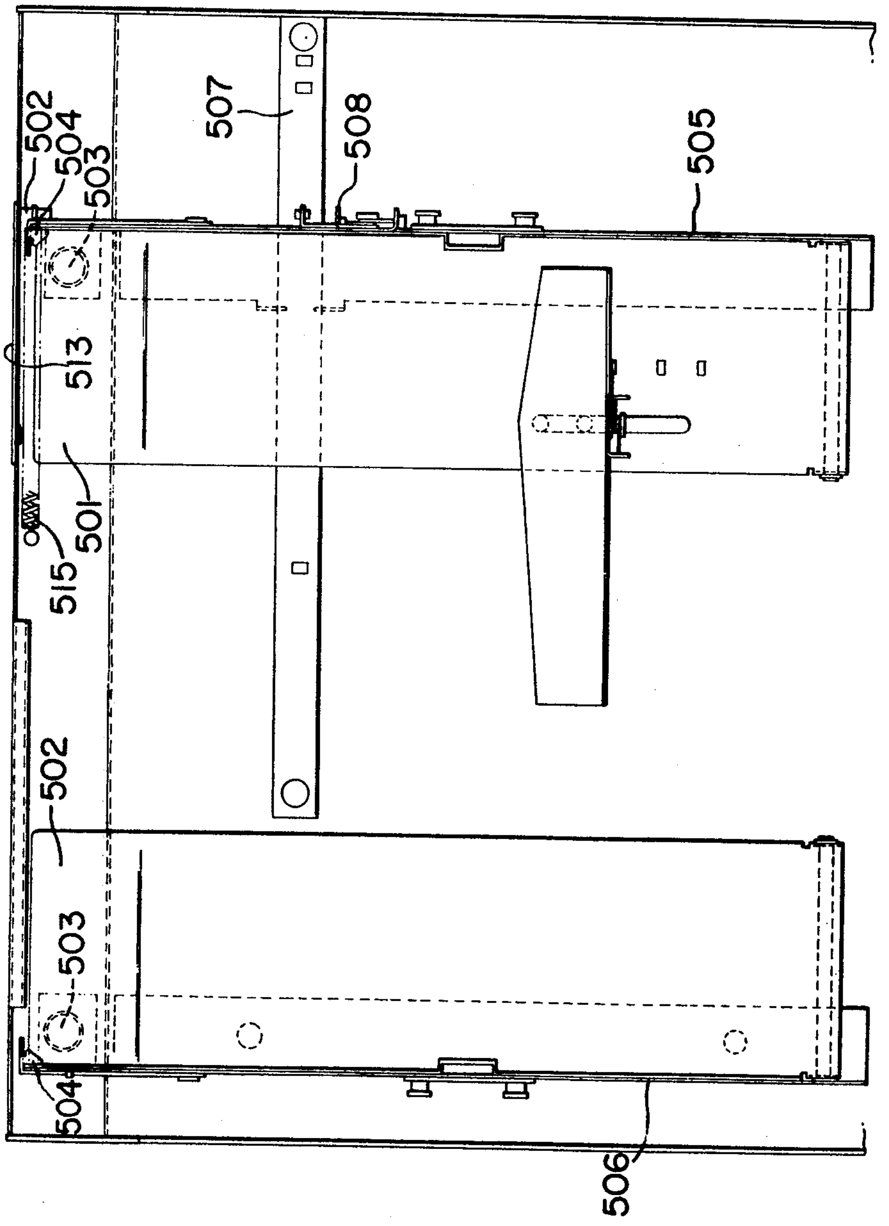
FIG. 39 is a plan view corresponding to FIG. 38.

Referring to FIGS. 38 and 39, intermediate plates 501 and 502 carrying thereon sheets of copy paper P are pivotable about their ends opposite to their copy paper feeding ends and are normally biased at the copy paper feeding ends by springs 503 to raise separator pawls 504 which are the means for separation of copy paper. The separator pawls 504 are pivotally mounted to side plates 505 and 506 and movable from gravity downwardly from an upper limit determined by a stop 510 to at least a position for effecting feeding operation. (This lower limit is determined by a stop 511.)

A feed roll 512 provided in a copying apparatus is rotated and lowered to depress the stock of paper sheets P to the feeding position. Thereupon, a direct pressure force from the springs 503 acts between the feed roll and the stock of copy paper P and a proper frictional force (feeding force) resulting from such pressure force and rotation of the feed roll cause an uppermost sheet of copy paper to be fed. At the same time, the separator pawl 504 comes down into contact with the stock of copy paper P from gravity and separate the uppermost sheet of copy paper.

Figure 41:
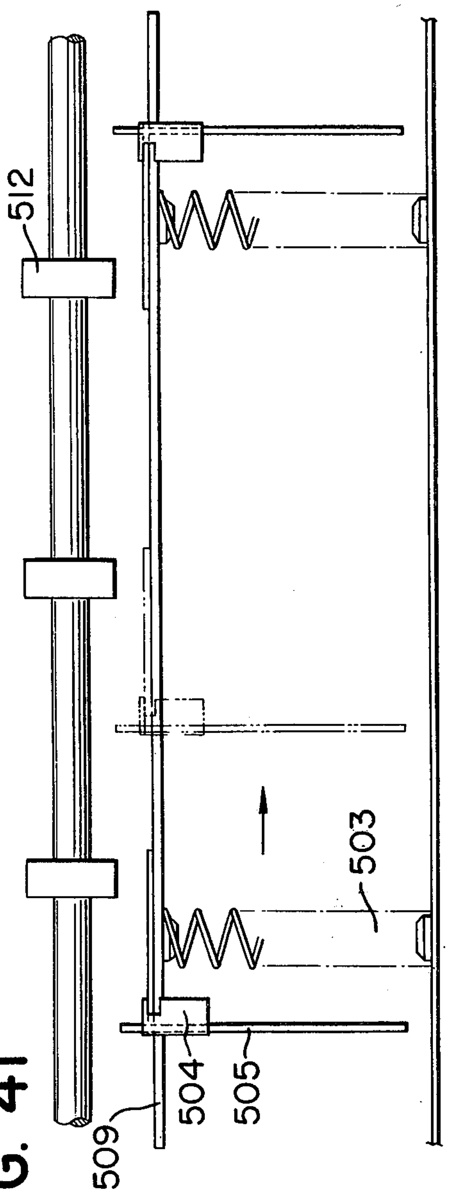
FIG. 41 illustrates the movement of a side plate in the prior art feeder bed.

More particularly, in the position shown in FIG. 41, each spring 503 has one end secured to a feeder bed base plate and the other end secured to a spring receiving plate 509 which is vertically movable.

Thus, exactly, the intermediate plates 501 and 502 take the spring forces from the springs 503 through the spring receiving plate 509 to raise the separator pawls 504. The side plate 505, with the intermediate plate 501 and the separator pawl 504, is movable along a rail 507 to limit the copy paper P to a suitable position in accordance with the size thereof. The movement of the side plate may be accomplished by means of a lever 508.

This system offers a problem that, when the intermediate plate and the side plate are moved in accordance with a small size of paper, as shown in FIG. 41, the distance between the spring 503 and the feed roll 512 creating the feeding force differs between the left and right sides of the apparatus, which results in a difference in pressure contact force and accordingly in feeding force between the left and right sides, thus causing copy paper P to be fed obliquely.

Figure 42:
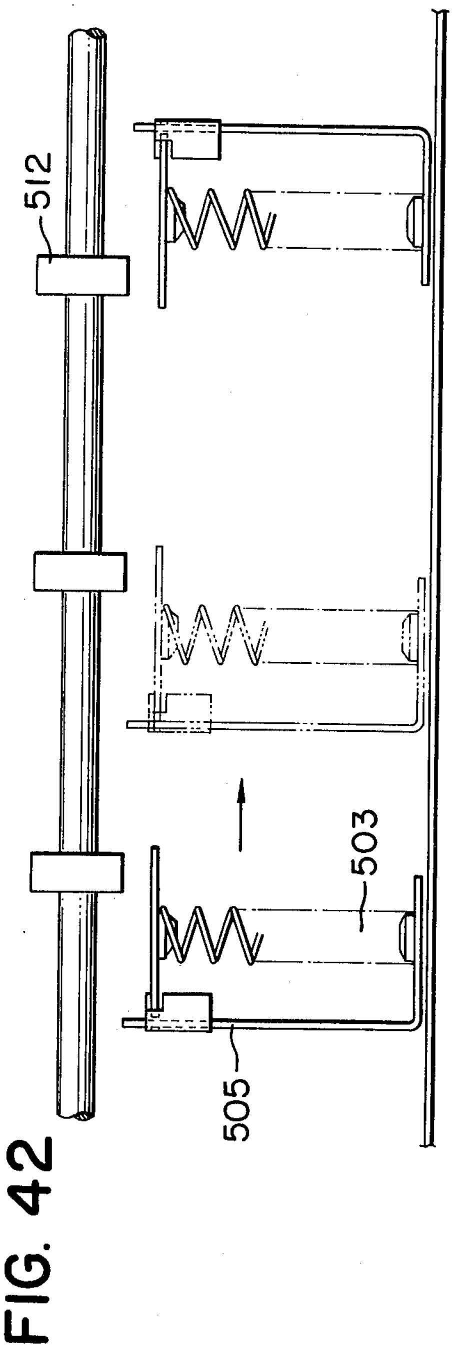
FIG. 42 illustrates the movement of a side plate in the embodiment of the paper feeder bed.
Figure 43:
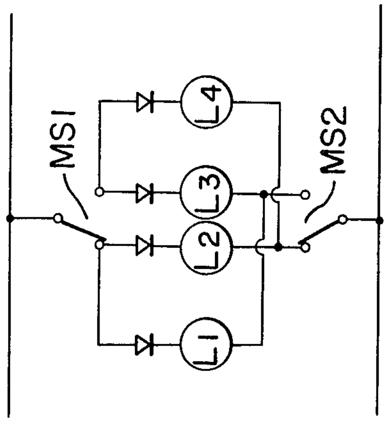
FIG. 43 is a circuit diagram of detector switches an indicator lamps.

Referring to FIG. 42, each spring 503 has one end secured to the lower bent portion of the side plate 503 and the other end secured to the intermediate plate 501, so that movement of the side plate 505 will cause simultaneous movement of separator pawl 504, side plate 505, intermediate plate 501 and spring 503 which are all integral with one another.

With the above-described construction, movement of the spring does not result in any variation in the relative position between the feed roll 512 and the copy paper irrespective of the size of the copy paper, and a uniform pressure contact force is maintained to ensure the feeding force at the left and right sides to be balanced at a constant level to enable stable feeding.

The present embodiment has been described as an application to a copy paper feeder bed in copying machine or the like, whereas it is not restricted to copying machines but is equally applicable to feeder beds for thin layers of paper, metal, plastics or like material.

Figure 40:
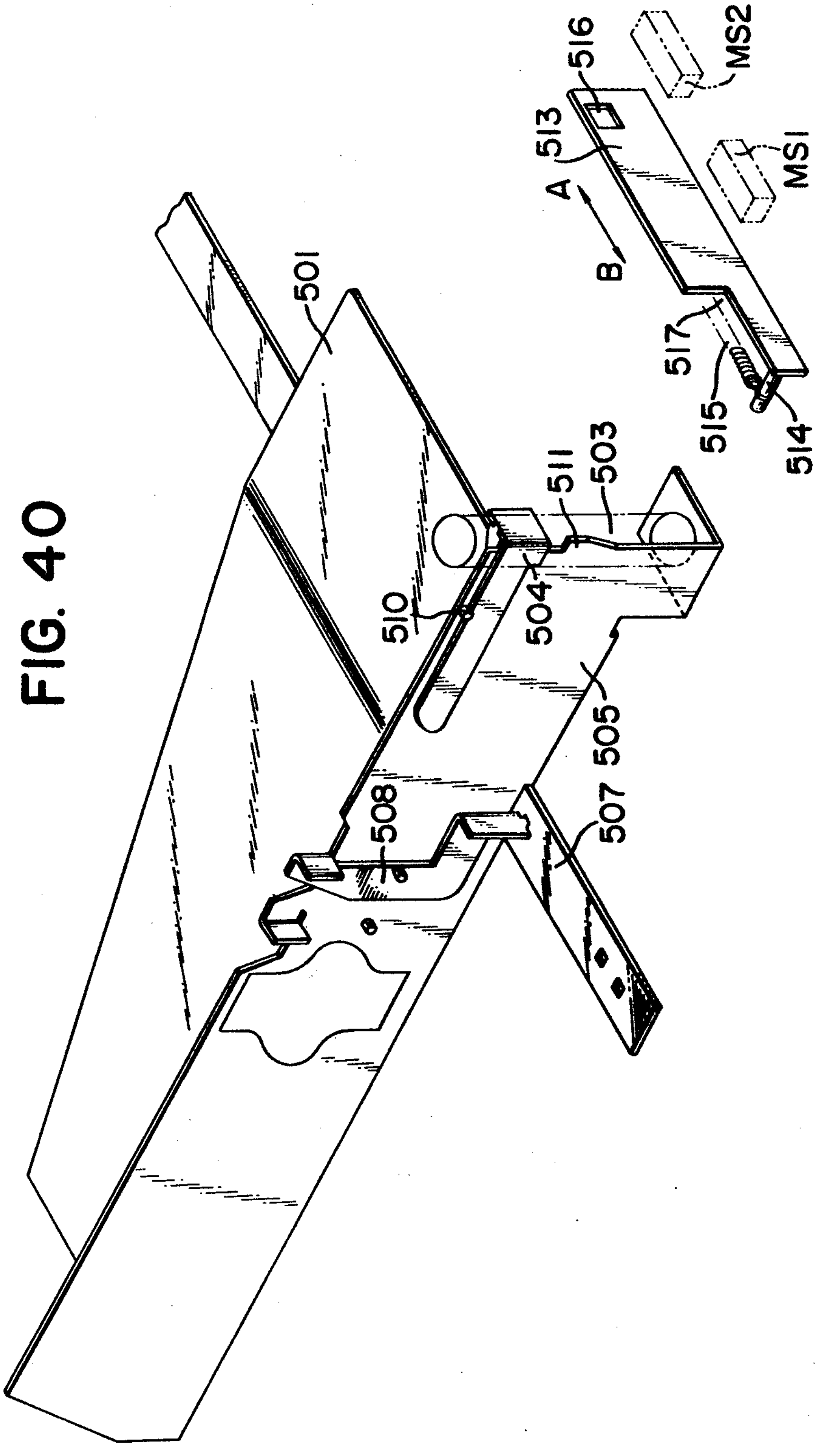
FIG. 40 is a perspective view of an embodiment of the paper feeder bed.

Also, in FIG. 40, a detector plate 513 is mounted on the copy paper feeding side of the feeder bed for movement in the directions of arrows A and B. The tip end of the projection 514 of the detector plate is engaged with the side plate 505 and normally biased in the direction A by a spring 515.

Figure 44:
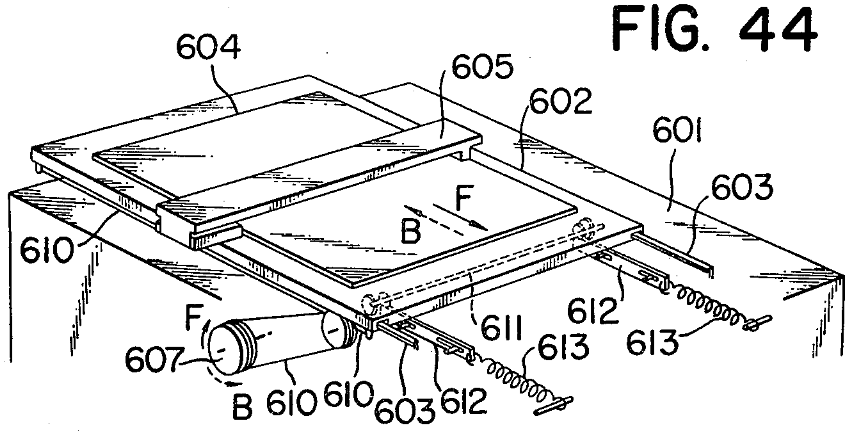
FIG. 44 is a perspective view of a portion of the original carriage to which the buffer and stop device is applied.

Microswitches MS1 and MS2 for detecting the size of copy paper are secured to the machine body and designed such that they are opened when their actuators pass through an aperture 516 and cut-away 517 in the detector plate 513 and that they are closed when their actuators do not pass through the aperture and cut-away. Therefore, if the side plate 505 is moved to match the size of the copy paper, the aperture 516 and cut-away 517 in the detector plate 513 will also be displaced to open and close the switches MS1 and MS2. The switches MS1 and MS2, as shown in FIG. 44, are connected to indicator lamps L1, L2, L3, L4 provided at suitable locations of the machine and one of these indicator lamps L1–L4 may be turned on at a time in accordance with a combination of ON and OFF of the switches MS1 and MS2.

In the above-described embodiments, it is shown that two switches are used to detect four different sizes of sheets, but generally the relation between the number N to be detected and the number n of the necessary switches may be obtained by an equation:

$$N = \sum_{x=0}^{n} nCx.$$

As described, a necessary number of size detection indicator switches are related to the side plate, and these switches are inserted in the energizing circuit for the indicator lamps to turn on a predetermined one of the indicator lamps at a time in accordance with the size of the copy paper then carried on the feeder bed. Thus, the size of the copy paper on the feeder bed may simply and readily be confirmed at any time, and this may prevent occurrence of malfunctioning and enhance the efficiency of office work.

Other Devices

Referring to FIG. 44, it shows an apparatus housing 601, an original carriage 602, guide rails 603 along which the original carriage is reciprocally moved, an original keep cover 604 having a handle 605, a reversible motor M, a drum shaft 606 and a drum 607.

Depression of a copy button causes forward rotation of the motor M which in turn causes forward rotation of the drum 607 in the direction F through the agency of gears 608 and 609, so that the original carriage 602 is moved forward in the direction F by means of a wire wound on the drum 607. Arrival of the original carriage at the end of its forward stroke is detected to produce a detection signal which reverses the rotation of the motor M, whereby the above-mentioned various parts assume backward movement in the direction B until the original carriage 602 is stopped at its home position shown in FIG. 44.

An original on the original carriage is illuminated during the above-described forward or backward stroke, and the original carriage 602 is temporarily stopped after each reciprocation, and restarted by a subsequent command.

Before the original carriage reaches its home position, the power supply to the motor M is cut off and the carriage later moves backward from inertia. During that time, a cross bar or projection 611 provided on the original carriage engages an engagement member 612 on the apparatus body and moves backward dragging it, so that the engagement member expands springs 613 to provide a buffer.

The "home position" herein used is a position at which the speed of the original carriage is reduced to zero by the resistance of the springs 613 and comes to a halt, and the present invention also relates to means for locking the original carriage at such position.

Figure 45:
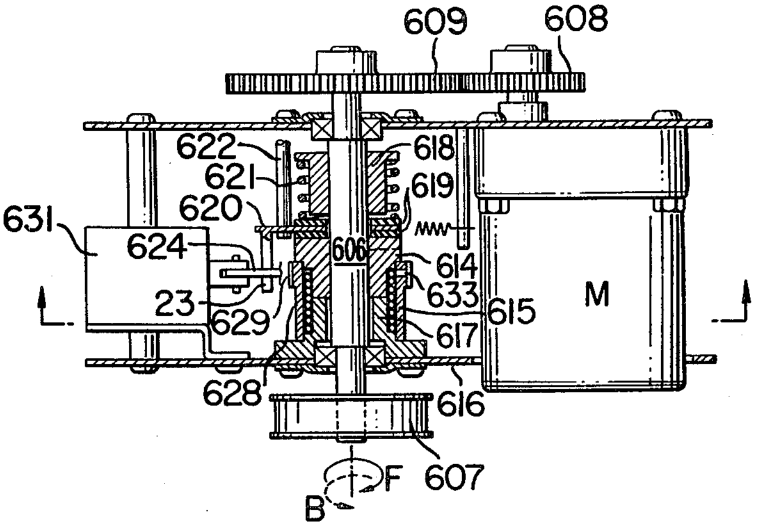
FIG. 45 is a longitudinal cross-section of the buffer and stop device.
Figure 46:
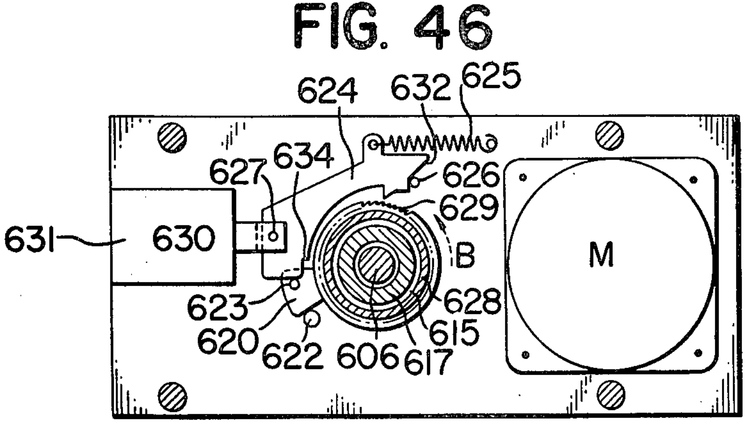
FIG. 46 and 47 are front view illustrating the manner in which the buffer and stop device operates.
Figure 47:
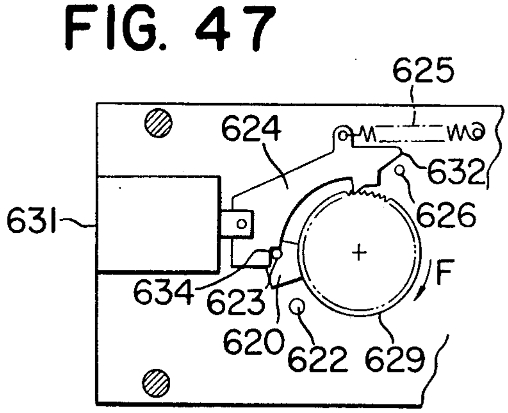

An example of such means is shown in FIGS. 45 to 47. When the drum shaft 606 is stopped as described, it tends to be moved forwardly in the direction F by a great magnitude of energy accumulated in the ends of the buffer springs 613 (which energy provides a starting energy which will be described). As a result, a clutch spring brake 615 formed by a rightwardly turned coil spring relatively tightly wound around a brake cylinder 614 secured to the drum shaft 606 is further tightened and coils around a brake cylinder 617, secured to a frame 616, to thereby lock the drum shaft 606 against rotation in the direction F, thus stopping the original carriage 602 at its home position.

Prior to the above-described operation, during the rotation of the drum shaft 606 in the direction B, a control plate 620 held between a spring receptacle 618 and the aforesaid brake cylinder 614 with a friction plate 619 interposed therebetween is urged by a spring 621 and rotated in the direction B by the frictional transmission from the brake cylinder 614 until it strikes a stop 622 as shown in FIG. 46, whereupon a control pin 623 liberates a control pawl 624. As a result, the control pawl 624 is pulled by a spring 625 with the inclined surface 632 of the pawl guided by a pin 626, so that the control pawl 624 is inclined about a pivot pin 627 and out of engagement with a ratchet wheel 629 on a control ring 628 for the spring brake.

Thus, the control ring 628 restraining one end 633 of the spring brake 615 permits this clutch spring brake to tighten in the direction F pursuant to the brake cylinder 614.

When the copy button is depressed, a solenoid 631 is electrically energized to cause a plunger 630 to attract the control pawl 624 in the manner as shown in FIG. 47. The control pawl 624 meshes with the ratchet wheel 629 to rotate the control ring 628 counter-clockwise and thereby loosen the spring brake 615 to unlock the drum shaft 606.

At the same time, the motor M is also rotated to rotate the drum 607 in the direction F. At that time, the force accumulated in the buffer springs 613 acts as the rising torque for rotation, and this enables quick starting of rotation of the drum shaft 606 even if the motor is an AC motor of small starting torque.

Such quick starting is particularly useful when the device is applied to a copying machine, for example. The reason is that the original carriage must quickly attain its constant velocity and a small drive force is only required once the constant velocity has been attained.

Rotation of the drum shaft 606 in the direction F also causes rotation of the control plate 620 in the same direction, so that the pin 623 thereon engages a stepped portion 634 of the control pawl 624 to maintain the control pawl in mesh engagement with the ratchet wheel 629 even after cut-off of the power supply to the solenoid 631, thus restraining the control ring 628. Therefore, even if the input signal to the solenoid 631 is of short period, the lock by the spring brake may be maintained released as long as the shaft 606 is rotated in the direction F.

The above-described spring brake mechanism acts as a special one-way brake which is not operative during the forward (F) and backward (B) movement of the original carriage 602 but effects locking only when the original carriage tends to be moved forward i.e. is rebound by the energy of the buffer springs 613 at the moment the carriage comes to a halt at the home position which is the end of the backward stroke.

Figure 48:
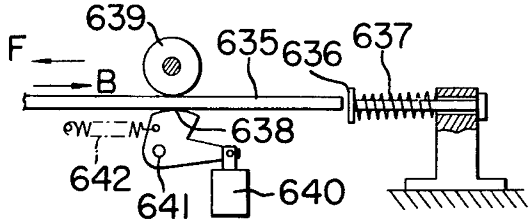
FIG. 48 is a front view of a modification of the buffer and stop device.

Another embodiment which is capable of effecting such action is shown in FIG. 48.

For example, when a brake rod 635 provided on the original carriage 602 is moved in the direction B of backward movement of the carriage to strike a stop 636, it forcibly constricts a buffer spring 637 while being thereby decellerated to zero velocity, thus coming to the home position. When the original carriage tries to revert to the forward direction F with the aid of the repulsion of the buffer spring 637, a brake cam 638 and a guide roller 639 hold and lock the brake rod 635 therebetween.

When the copy button is depressed, a solenoid 640 is energized to rotate the cam 638 clockwise to unlock the brake rod, and the spring 637 now serves to assist in the starting torque.

The foregoing embodiments have been shown to employ springs as the energy accumulator, whereas this is not the only possible form but use may be made of any means which can accumulate and discharge kinetic energy (such as pneumatic springs, rubber or the like).

Thus, the present mechanism can fully alleviate a shock in that it converts the kinetic energy of a moving body into a potential energy of spring while decellerating the moving body to a halt. Further, it can relatively simply be constructed by the use of energy absorbing springs and a one-way clutch mechanism and this leads to a high reliability and low cost of the mechanism. Furthermore, when the moving body is to be moved in the opposite direction, the energy accumulated in the springs assists in the rising of the movement in the opposite direction and it is thus possible to realize quick starting and effective utilization of the energy.

Figure 49:
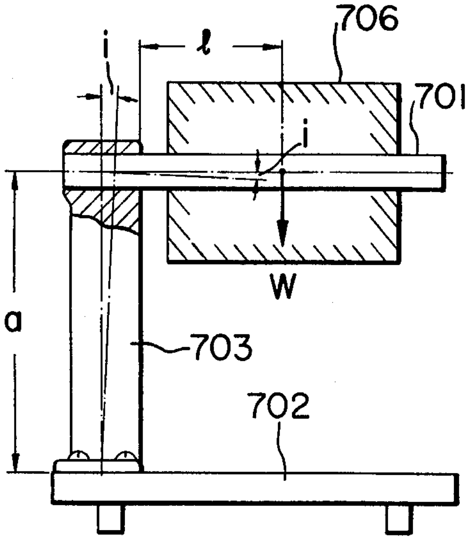
FIGS. 49 and 51 illustrate the construction according to the prior art.

According to the prior art, the photosensitive drum has been supported, as shown in FIG. 49, by rigidly coupling the fixed end of the drum shaft 701 to the bottom plate 702 of the machine by means of a support member 703.

With regard particularly to the deflection of the support member 703, it is the deflection angle of that portion of the support member 703 fixing the drum shaft 701 which imparts a displacement to the drum 706. The deflection angle i may be expressed as:

$$i = Ma/EI,$$

where M is a moment produced in the support member 703 by the weight W of the drum 706 and is a result of the weight W multiplied by the length l from the support member to the load point of the drum shaft 701, and a, E and I are the length, the Young's modulus and the principal moment of inertia of area, respectively, of the support member 703.

Figure 50:
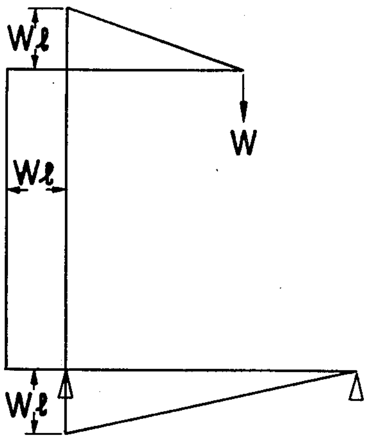
FIG. 50 is a diagram of the movement in the construction of FIG. 49.

As will be seen from the above equation, a smaller value for a is advisable to provide the drum shaft 701 with rigidity. According to this method, the dimension a is determined by other factors and therefore, the section modulus must unavoidably be increased for compensation. Also, as shown in FIG. 50, the moment M=Wl covers even the bottom plate 702, so the bottom plate must also be rigid. Thus, such a cantilever construction usually leads to increased dimensions and greater weight of the structure, which would unavoidably incur high shipping expenses of the machine.

Figure 51:
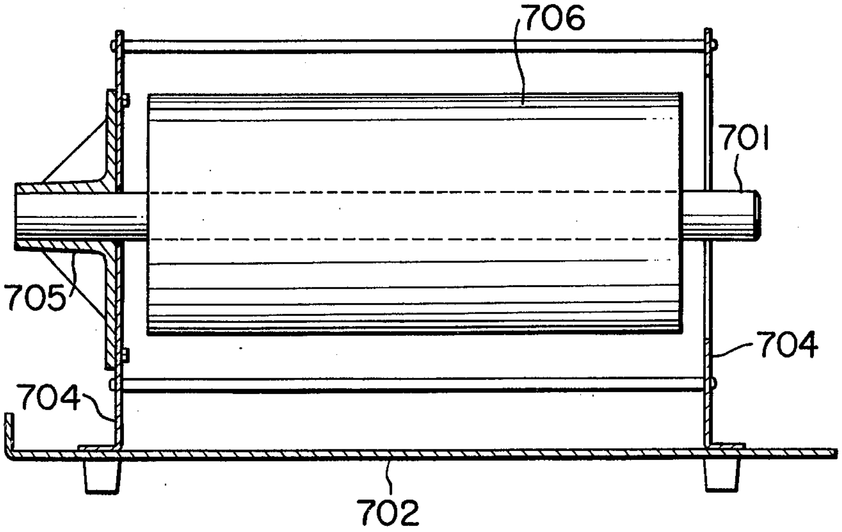

Another cantilever-fashioned supporting method is illustrated in FIG. 51. This comprises attaching a support member 705 to one side plate frame 704 to cause the moment produced in the fixed end of the drum shaft 701 to be dissipated in the side plate frame 704 and thereby provide a support, but such method is only suitable for very small machines and not for medium- or large-size machines.

Referring to FIGS. 52 to 55, there is shown a method which enables a rigid cantilever to be fixed to a light-weight (and thus somewhat weak) machine body.

Figure 52:
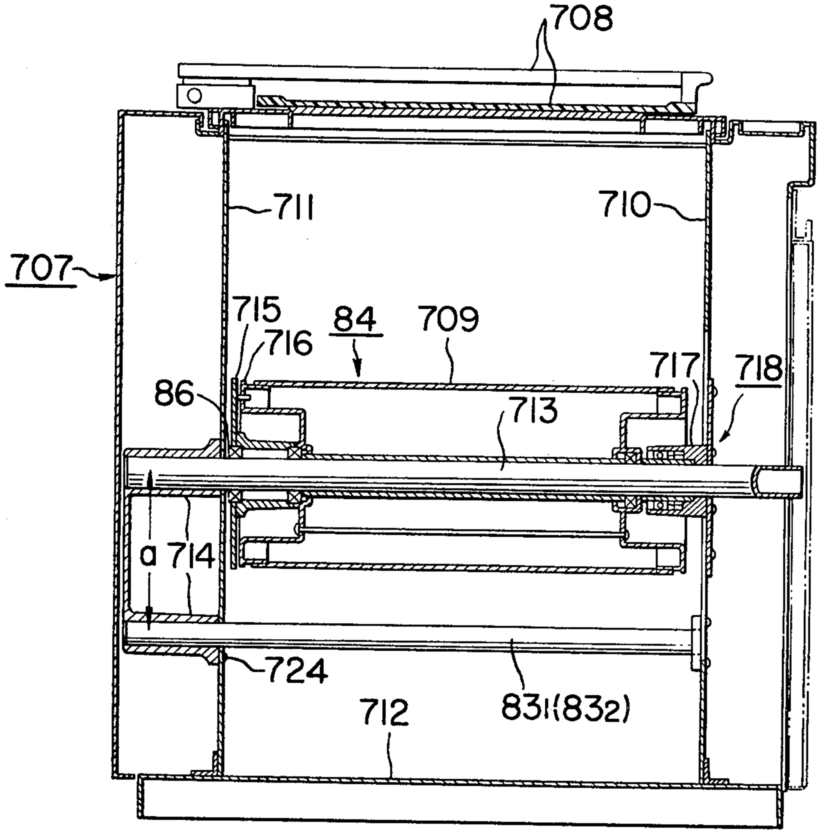
FIG. 52 is a transverse cross-section of the photosensitive drum supported in an electrophotographic copying apparatus in a cantilever fashion according to the invention.

FIG. 52 shows the main housing 707 of a copying machine, a reciprocally movable original carriage 708, plate-like frames 710 and 711 for assembling various devices thereto, the frames being coupled together by a stay (not shown), and a bottom plate 712. The rear side frame 711 is provided with a support member 714 of alloy casting substantially centrally thereof for supporting a drum shaft 713, and the drum shaft 713 is firmly fixed to the support member.

Figure 53:
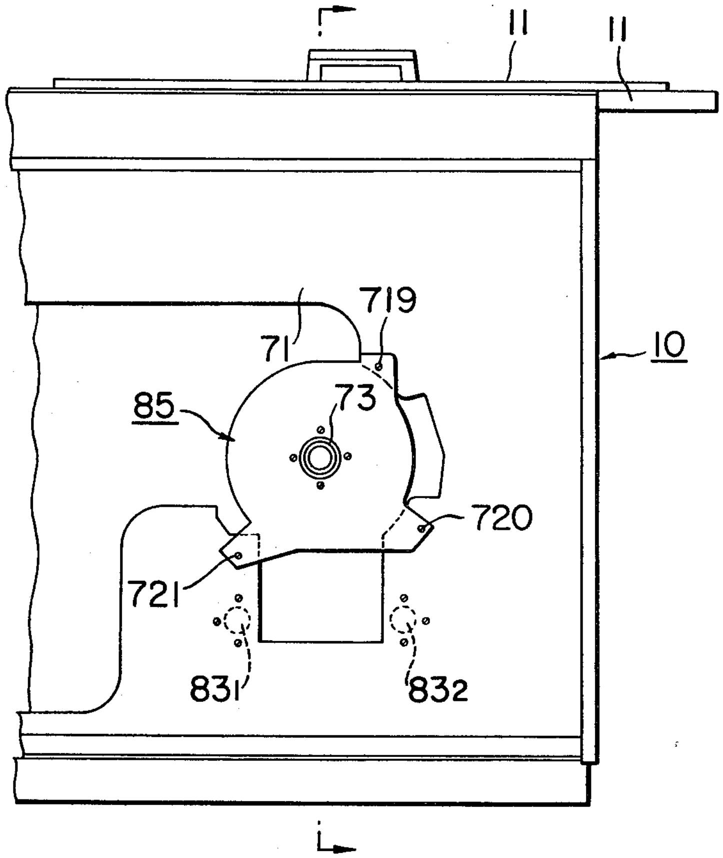
FIG. 53 is a fragmentary front view corresponding to FIG. 52.

A gear 715 is mounted on the drum shaft 713 and rotatable by ball bearings, and driven from a main motor (not shown). The drum gear 715 has a pin 716 fixed thereto and driving a drum unit 719 which comprises a photosensitive drum 706 or the like inserted over the shaft 713. The idle end (the right end in FIG. 51) of the drum shaft 713 may be supported by a support unit 718 including a support metal 717 or the like, to ensure the safety of the drum shaft in the event that an excessive load is exerted thereon for some reason or other. This support unit is for the purpose of safety and is not always necessary. The support unit 718, as shown in FIG. 53, is fixed to the frame 710 by means of three screws 719–721 and readily removable when the drum unit 719 is to be removed from the shaft 713.

Support bars 722 and 723 are firmly fitted to the lower portions of the support member 714, and the other ends of these support bars 722 and 723 are securely fixed to the frame 710. The support member 714 is also fixed to the frame 711 by a plurality of screws 724.

With the above-described construction, the drum shaft 713 may provide a rigid cantilevered shaft because the shaft 713 is supported to the frames 710 and 711 over a wide span by the support member 714 and the support bars 722,723 and because the dimension a of the support member 714 is so small that the rigidity thereof is relatively increased.

Figure 54:
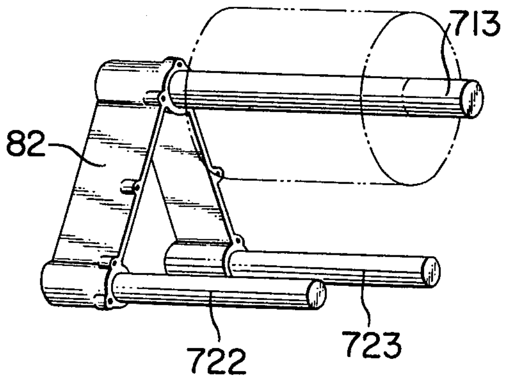
FIG. 54 is a perspective view of the essential portion of FIG. 52.

FIG. 54 is a perspective view showing the drum 713, support member 714 and support bars 722,723 of FIG. 52. In the present embodiment, the cantilevered shaft 713 and the support bars 722,723 are arranged so as to occupy the vertices of a regular triangle, whereas they are not restricted to such arrangement. The number of the support bars is neither restricted to two.

Figure 55:
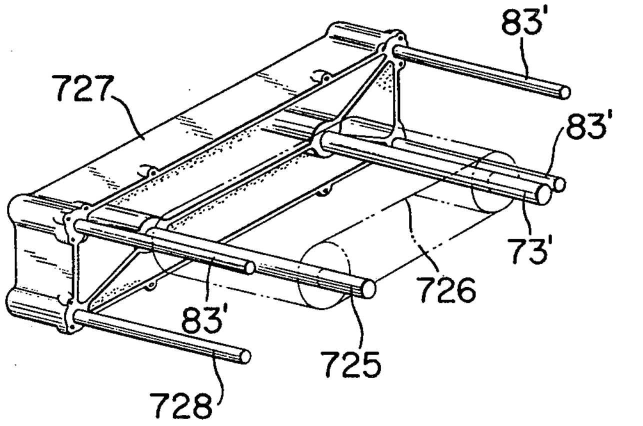
FIG. 55 is a perspective view of another embodiment of the supporting device.

FIG. 55 shows an embodiment in which two cantilevered shafts 725 support a photosensitive belt unit 726 having a belt-like photosensitive medium. A support member 727 is carried on the fixed ends of the cantilevered shafts 725, and support bars 728 are located at the four corners of the support member. The support member 727 is coupled to one frame of the machine body and the free ends of the support bars 728 are coupled to the other frame, as in the case of FIG. 52.

In the shown embodiments, the support member 714 (727) and the support bars 722,723 (728) are separate, but these may be integral. Further, the frames 710,711 are not restricted to the plate-like form, but may be in a skeleton-like form. Also, in addition to the photosensitive drum 709, various photographic process mechanisms are incorporated in the shown copying machine, but they are omitted for convenience.

The above-described construction permits the frames to be relatively weak and this leads to reduction in the cost and weight of the machine. Further, the moment produced by the cantilever support is taken by support bars 722 and 723 and does not affect the bottom plate and thus, the bottom portion may also be designed with a low cost and light weight, which means a cantilever-fashioned support structure effective and suitable for a variety of machines and apparatuses.

We claim:

1. A device for controlling a movable member of a copying machine which reciprocates in forward and reverse directions to scan an original, comprising:

a movable member for carrying and reciprocating an original to be copied;

driving means for moving said movable member in forward and reverse directions;

buffer stopping means for absorbing and storing energy from the reverse movement of said movable member while braking and stopping the reverse movement of said movable member at an end position of the reverse movement, and for applying a force in the forward direction to said movable member from the stored energy upon the start of forward movement of said movable member;

movement restricting means for preventing the forward movement of said movable member, while allowing the reverse movement thereof, when said movable member is braked by said buffer stopping means; and control means for releasing the preventing action of said movement restriction means to enable application of the force in the forward direction from the stored energy in said buffer stopping means to said movable member, when the forward movement of said movable member is to be started.

2. A device according to claim 1, wherein said movement restricting means includes a one-way spring brake.

* * * * *